US012703399B2

(12) United States Patent
Kume et al.

(10) Patent No.: US 12,703,399 B2
(45) Date of Patent: Aug. 11, 2026

(54) AUTONOMOUS DRIVING CONTROL DEVICE

(71) Applicant: DENSO CORPORATION, Kariya-city (JP)

(72) Inventors: Takuya Kume, Kariya-city (JP); Kazuki Izumi, Kariya-city (JP)

(73) Assignee: DENSO CORPORATION, Kariya-city (JP)

(*) Notice: Subject to any disclaimer, the term of this patent is extended or adjusted under 35 U.S.C. 154(b) by 246 days.

(21) Appl. No.: 18/588,907

(22) Filed: Feb. 27, 2024

(65) Prior Publication Data

US 2024/0253670 A1 Aug. 1, 2024

Related U.S. Application Data

(63) Continuation of application No. PCT/JP2022/030591, filed on Aug. 10, 2022.

(30) Foreign Application Priority Data

Sep. 2, 2021 (JP) ................................ 2021-143379
Jul. 29, 2022 (JP) ................................ 2022-121375

(51) Int. Cl.
*B60W 60/00* (2020.01)
*B60W 50/14* (2020.01)

(52) U.S. Cl.
CPC ........ *B60W 60/0053* (2020.02); *B60W 50/14* (2013.01); *B60W 2552/10* (2020.02); *B60W 2554/4044* (2020.02)

(58) Field of Classification Search
None
See application file for complete search history.

(56) References Cited

U.S. PATENT DOCUMENTS

2008/0221767 A1 9/2008 Ikeda et al.
2017/0203770 A1* 7/2017 Kondo .................. B60W 50/14
2018/0046185 A1* 2/2018 Sato ..................... G05D 1/0088
2018/0129206 A1* 5/2018 Harada ............... B60W 50/082
2019/0235499 A1* 8/2019 Kazemi ................ G01S 17/931
2019/0317506 A1 10/2019 Ishioka
2020/0307594 A1 10/2020 Kato et al.
(Continued)

FOREIGN PATENT DOCUMENTS

JP 2007062651 A 3/2007
JP 2016146056 A * 8/2016
(Continued)

OTHER PUBLICATIONS

Espacenet English Translation of JP2016146056A (Year: 2016).*
2020 Honda Legend Honda Sensing Elite Owner's manual p. 350-351.

*Primary Examiner* — James J Lee
*Assistant Examiner* — Andrew Sang Kim
(74) *Attorney, Agent, or Firm* — Harness, Dickey & Pierce, P.L.C.

(57) ABSTRACT

A road shape grasping unit is configured to grasp a road shape of a merging area present in a traveling direction of a subject vehicle traveling with an autonomous travel control in which a driver has no surroundings monitoring obligation. A continuation determination unit is configured to determine, according to the road shape of the merging area, whether to continue the autonomous travel control in the merging area.

18 Claims, 20 Drawing Sheets

(56) References Cited

U.S. PATENT DOCUMENTS

| | | | | |
|---|---|---|---|---|
| 2020/0307596 | A1 | 10/2020 | Yashiro | |
| 2021/0387632 | A1 | 12/2021 | Sugawara et al. | |
| 2022/0340166 | A1 | 10/2022 | Kume et al. | |
| 2023/0067887 | A1* | 3/2023 | Garg | B60W 60/001 |

FOREIGN PATENT DOCUMENTS

| | | | |
|---|---|---|---|
| JP | 2020160956 | A | 10/2020 |
| JP | 2020163908 | A | 10/2020 |
| JP | 6817334 | B2 | 1/2021 |
| WO | WO-2020075477 | A1 | 4/2020 |
| WO | WO-2021140917 | A1 | 7/2021 |

* cited by examiner

CfA
CfA
Lnc
Am
HW
Lnc
Am
HW

AUTONOMOUS DRIVING CONTROL DEVICE

CROSS REFERENCE TO RELATED APPLICATION

The present application is a continuation application of International Patent Application No. PCT/JP2022/030591 filed on Aug. 10, 2022, which designated the U.S. and claims the benefit of priority from Patent Application No. 2021-143379 filed in Japan on Sep. 2, 2021, and Patent Application No. 2022-121375 filed in Japan on Jul. 29, 2022. The entire disclosures of all of the above applications are incorporated herein by reference.

TECHNICAL FIELD

The present disclosure relates to an autonomous driving control device.

BACKGROUND

A vehicle control system that performs autonomous driving has been developed.

SUMMARY

According to an aspect of the present disclosure, an autonomous driving control device is configured to allow a subject vehicle to travel with autonomous travel control.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
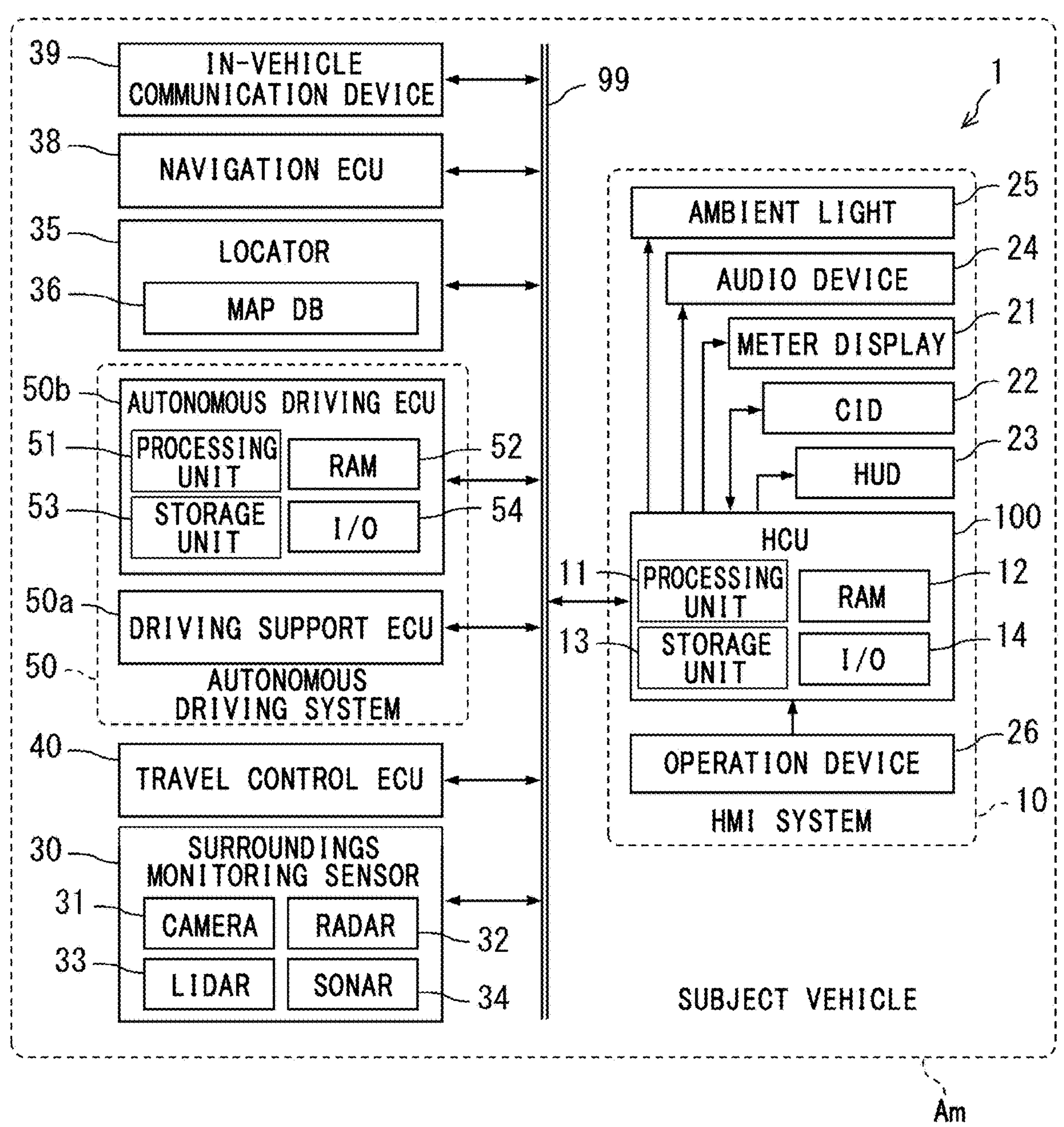
FIG. 1 is a diagram illustrating an overview of an in-vehicle network including an autonomous driving ECU according to and embodiment of the present disclosure.

Hereinafter, examples of the present disclosure will be described.

According to an example of the present disclosure, a vehicle control system prohibits traveling performed in an autonomous driving mode when a subject vehicle travels in a section including a merging point or a branching point.

In the case of the configuration in which the vehicle control system prohibits traveling performed according to autonomous driving when the vehicle travels in a section including a merging point or a branching point, duration of traveling according to autonomous driving is reduced. As a result, even when autonomous driving in which a driver has no surroundings monitoring obligation is implemented, monitoring of the surroundings by the driver is required soon, and it is considered that convenience of the autonomous driving is impaired.

According to an example of the present disclosure, an autonomous driving control device is configured to allow a subject vehicle to travel with autonomous travel control in which a driver has no surroundings monitoring obligation. The autonomous driving control device comprises:

- a road shape grasping unit configured to grasp a road shape of a merging area present in a traveling direction of the subject vehicle traveling with the autonomous travel control; and
- a continuation determination unit configured to determine, according to the road shape of the merging area, whether to continue the autonomous travel control in the merging area.

According to an example of the present disclosure, a non-transitory computer readable medium stores a computer program to allow a subject vehicle to travel with autonomous travel control in which a driver has no surroundings monitoring obligation. The computer program comprises instructions. The instructions are, when executed by at least one processor, configured to cause the at least one processor to:

- grasp a road shape of a merging area present in a traveling direction of the subject vehicle traveling with the autonomous travel control; and
- determine, according to the road shape of the merging area, whether to continue the autonomous travel control in the merging area.

In this aspect, a road shape in a merging area present in a traveling direction is grasped, and whether to continue autonomous travel control in the merging area is determined according to the road shape of the merging area. According to the above, also in the merging area, the autonomous travel control can be continued depending on the road shape, and thus it is possible to secure a long period in which the surroundings monitoring of the driver is unnecessary. Accordingly, the convenience of the autonomous driving can be secured.

According to an example of the present disclosure, an autonomous driving control device is configured to allow a subject vehicle to travel with autonomous travel control in which a driver has no surroundings monitoring obligation. The autonomous driving control device comprises:

a road shape grasping unit configured to grasp a road shape of a merging area in which a merging lane and a main vehicular lane merge, when the subject vehicle travels with the autonomous travel control in the merging lane; and a continuation determination unit configured to change a driving control state of the subject vehicle including the autonomous travel control according to the road shape of the merging area.

According to an example of the present disclosure, a non-transitory computer readable medium stores a computer program to allow a subject vehicle to travel with autonomous travel control in which a driver has no surroundings monitoring obligation. The computer program comprises instructions. The instructions are, when executed by at least one processor, configured to cause the at least one processor to:

grasp a road shape of a merging area in which a merging lane and a main vehicular lane merge, when the subject vehicle travels with the autonomous travel control in the merging lane; and change a driving control state of the subject vehicle including the autonomous travel control according to the road shape of the merging area.

In this aspect, when the subject vehicle travels in a merging lane according to the autonomous travel control, the road shape of the merging area merging into a main vehicular lane is grasped, and a driving control state of the subject vehicle is changed according to the road shape of the merging area. According to the above, even in the merging area, the driving control state having a low dependency on the driver can be continued according to the road shape. As a result, the convenience of the autonomous driving can be secured.

According to an example of the present disclosure, an autonomous driving control device is configured to allow a subject vehicle to travel with autonomous travel control in which a driver has no surroundings monitoring obligation. The autonomous driving control device comprises:

a road shape grasping unit configured to grasp whether a branching area, in which the number of lanes increases, is present in a traveling direction of the subject vehicle traveling with the autonomous travel control;

a subject vehicle position grasping unit configured to grasp a position of a subject vehicle lane in which the subject vehicle travels; and a continuation determination unit configured to interrupt the autonomous travel control, when a branch lane, which is an increased lane in the branching area, is adjacent to the subject vehicle lane, and permit continuation of the autonomous travel control, when the branch lane is not adjacent to the subject vehicle lane.

According to an example of the present disclosure, a non-transitory computer readable medium stores a computer program to allow a subject vehicle to travel with autonomous travel control in which a driver has no surroundings monitoring obligation. The computer program comprises instructions. The instructions are, when executed by at least one processor, configured to cause the at least one processor to:

grasp whether a branching area, in which the number of lanes increases, is present in a traveling direction of the subject vehicle traveling with the autonomous travel control;

grasp a position of a subject vehicle lane in which the subject vehicle travels; and interrupt the autonomous travel control, when a branch lane, which is an increased lane in the branching area, is adjacent to the subject vehicle lane, and permit continuation of the autonomous travel control, when the branch lane is not adjacent to the subject vehicle lane.

In this aspect, the autonomous travel control is interrupted when the branch lane and the subject vehicle lane are adjacent to each other in the branching area, whereas continuation of the autonomous travel control is permitted when the branch lane and the subject vehicle lane are not adjacent to each other. That is, the autonomous travel control can be continued even in the branching area as long as the vehicle travels in a lane separated from the branch lane. According to the above, since it is possible to secure a long period in which surroundings monitoring of the driver is unnecessary, it is possible to secure the convenience of autonomous driving.

According to an example of the present disclosure, an autonomous driving control device is configured to allow a subject vehicle to travel with autonomous travel control in which a driver has no surroundings monitoring obligation. The autonomous driving control device comprises:

a road shape grasping unit configured to, when a scheduled route of the subject vehicle, which travels with the autonomous travel control on a specific road on which traveling with the autonomous travel control is permitted, is set to a branch lane branching from a main vehicular lane of the specific road, grasp whether an end of the branch lane is an exit from the specific road; and a control change unit configured to, when the autonomous travel control is ended in the subject vehicle traveling toward the branch lane, change a content of travel control of the subject vehicle after the autonomous travel control is ended according to whether the end of the branch lane is the exit.

According to an example of the present disclosure, a non-transitory computer readable medium stores a computer program to allow a subject vehicle to travel with autonomous travel control in which a driver has no surroundings monitoring obligation. The computer program comprises instructions. The instructions are, when executed by at least one processor, configured to cause the at least one processor to:

when a scheduled route of the subject vehicle, which travels with the autonomous travel control on a specific road on which traveling with the autonomous travel control is permitted, is set to a branch lane branching from a main vehicular lane of the specific road, grasp whether an end of the branch lane is an exit from the specific road; and when the autonomous travel control is ended in the subject vehicle traveling toward the branch lane, change a content of travel control of the subject vehicle after the autonomous travel control is ended according to whether the end of the branch lane is the exit.

In this aspect, when the scheduled route of the subject vehicle traveling with the autonomous travel control is set to the branch lane, the contents of travel control after end of the autonomous travel control are changed according to whether the end of the branch lane is an exit from the highway. According to the above, it is possible to switch the operating state of the autonomous driving function according to whether the autonomous travel control can be performed at the end of the branch lane. As a result, the driver can smoothly transition to traveling at the end of the branch lane. Accordingly, the convenience of autonomous driving can be secured.

A function of an autonomous driving control device according to an embodiment of the present disclosure is implemented by an autonomous driving electronic control unit (ECU) 50*b* illustrated in FIG. 1. The autonomous driving ECU 50*b* is mounted on a vehicle (hereinafter, referred to as a subject vehicle Am) together with a driving support ECU 50*a*. The autonomous driving ECU 50*b* constitutes an autonomous driving system 50 of the subject vehicle Am together with the driving support ECU 50*a* and the like. By mounting the autonomous driving system 50, the subject vehicle Am becomes an autonomous vehicle having an autonomous driving function and can travel by the autonomous driving function.

The driving support ECU 50*a* in the autonomous driving system 50 is an in-vehicle ECU that implements a driving support function for supporting a driving operation of a driver. The driving support ECU 50*a* enables partial autonomous driving or advanced driving support of about Level 2 of an autonomous driving level defined by the Society of Automotive Engineers. Autonomous driving performed by the driving support ECU 50*a* is autonomous driving in which the driver has a surroundings monitoring obligation and needs to monitor the surroundings of the subject vehicle by visual observation.

The autonomous driving ECU 50*b* is an in-vehicle ECU that implements an autonomous travel function capable of substituting a driving operation of the driver. The autonomous driving ECU 50*b* can perform autonomous travel of Level 3 or higher in which the system is a control subject. The autonomous driving performed by the autonomous driving ECU 50*b* is autonomous driving that does not require monitoring the surroundings of the subject vehicle, that is, eyes-off autonomous driving in which the driver has no surroundings monitoring obligation.

In the autonomous driving system 50, a control state of the autonomous driving function is switched between multiple types of control including at least autonomous driving control performed by the driving support ECU 50*a* in which the driver has a surroundings monitoring obligation and autonomous driving control performed by the autonomous driving ECU 50*b* in which the driver has no surroundings monitoring obligation. In the following description, the autonomous driving control of Level 2 or lower performed by the driving support ECU 50*a* is referred to as “driving support control”, and the autonomous driving control of Level 3 or higher performed by the autonomous driving ECU 50*b* is referred to as “autonomous travel control”. The autonomous driving ECU 50*b* may be capable of performing autonomous driving of Level 4 or higher. Further, the autonomous driving ECU 50*b* may be capable of performing the driving support control in place of the driving support ECU 50*a* in a scene in which the autonomous travel control is temporarily interrupted.

During autonomous travel in which the subject vehicle Am travels according to the autonomous travel control of the autonomous driving ECU 50*b*, the driver can be permitted to perform a specific act (hereinafter, referred to as a second task) other than predetermined driving. The driver is legally permitted to perform the second task until an execution request for a driving operation to be performed by the autonomous driving ECU 50*b* in coordination with a human machine interface control unit (HCU) 100 described later, that is, a request for a driving takeover is made. For example, acts such as viewing entertainment contents such as video contents, operating a device such as a smartphone or the like, and having a meal are assumed as the second task.

Figure 2:
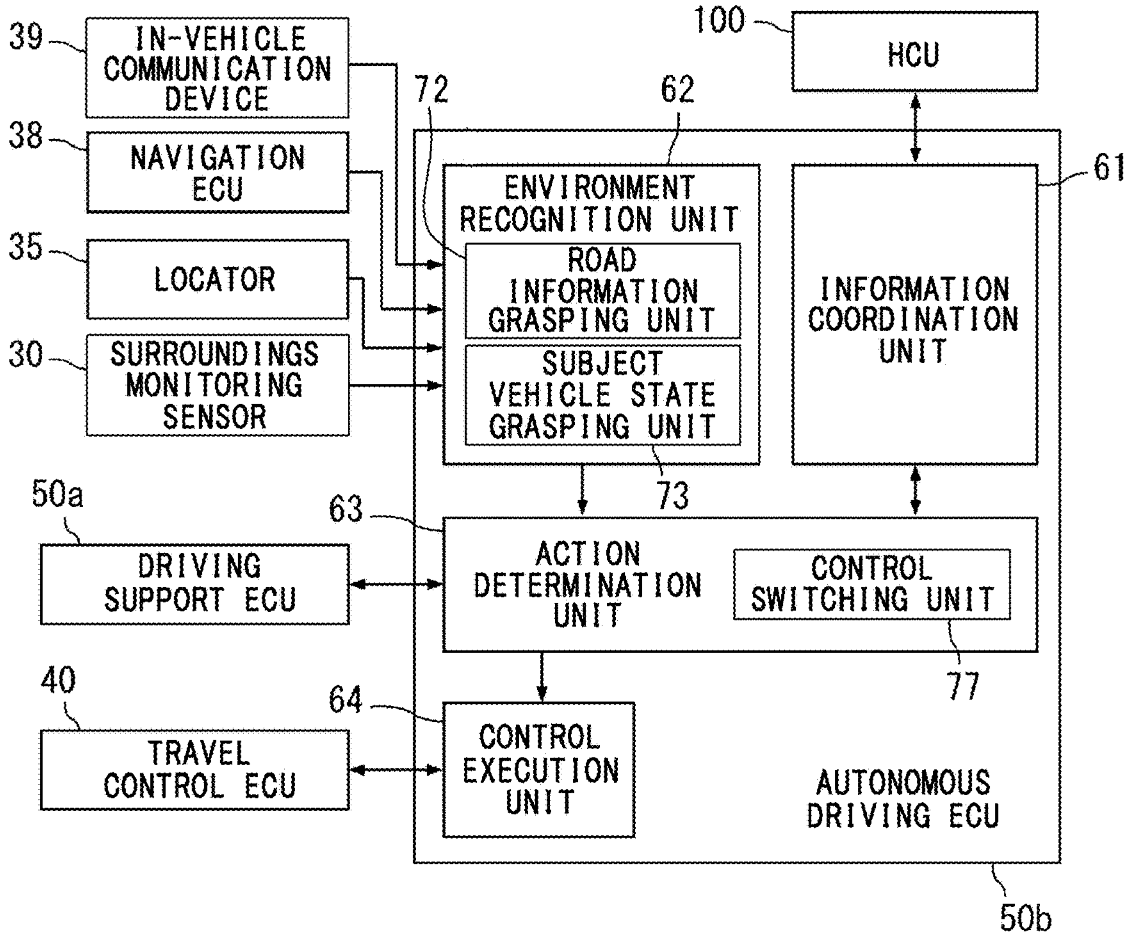
FIG. 2 is a block diagram illustrating details of the autonomous driving ECU.
Figure 3:
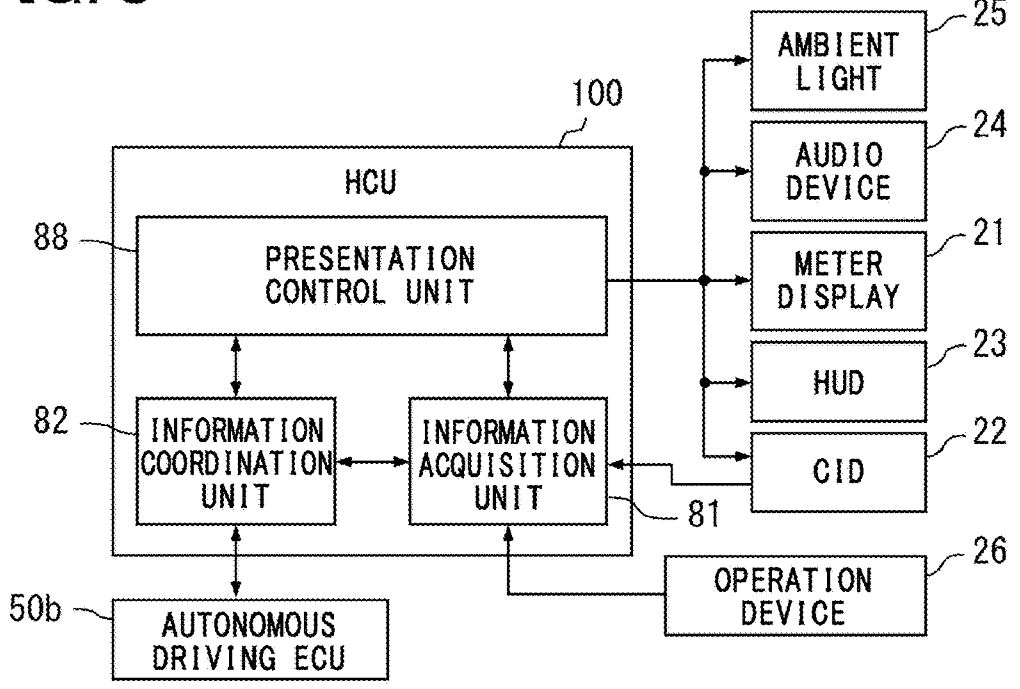
FIG. 3 is a block diagram illustrating details of an HCU.
Figure 4:
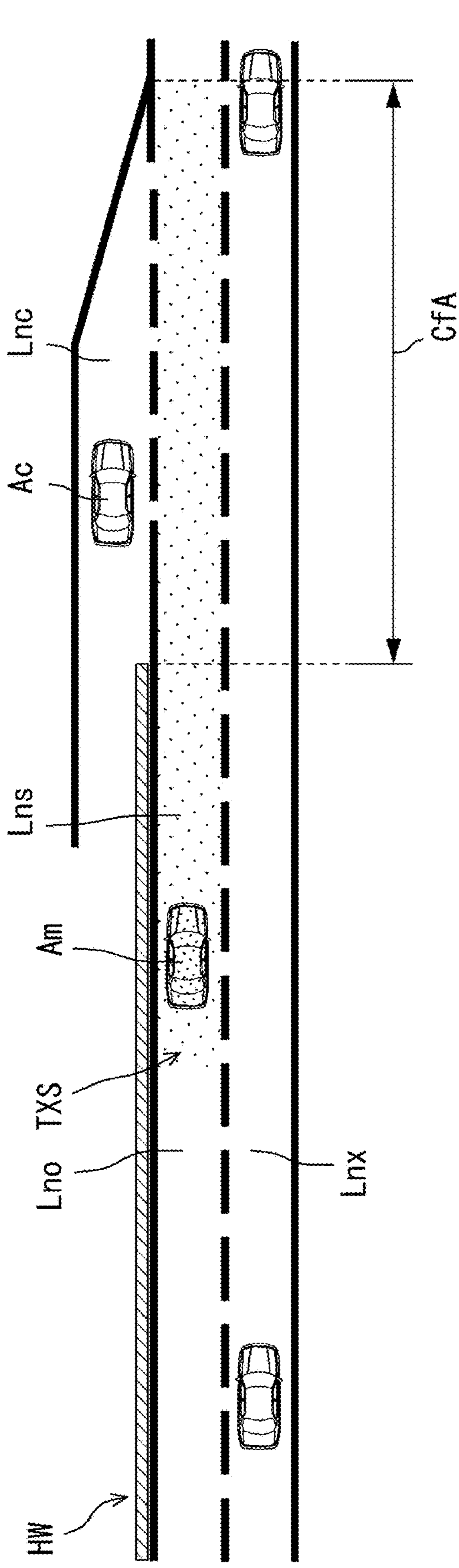
FIG. 4 is a diagram illustrating an example of a scene of approaching a merging area.

The driving support ECU 50*a* and the autonomous driving ECU 50*b* are communicably connected to a communication bus 99 of an in-vehicle network 1 mounted on the subject vehicle Am. As illustrated in FIGS. 1 to 3, a surroundings monitoring sensor 30, a locator 35, a navigation ECU 38, an in-vehicle communication device 39, a travel control ECU 40, the HCU 100, and the like are connected to the communication bus 99. These nodes connected to the communication bus 99 can communicate with each other. Specific nodes among the ECUs and the like may be directly electrically connected to each other and may communicate with each other without the communication bus 99.

The surroundings monitoring sensor 30 is an autonomous sensor configured to monitor a surrounding environment of the subject vehicle Am. The surroundings monitoring sensor 30 includes, for example, one or more of a camera unit 31, a millimeter-wave radar 32, a LIDAR 33, and a sonar 34. The surroundings monitoring sensor 30 can detect a moving object and a stationary object from a detection range around the subject vehicle. The surroundings monitoring sensor 30 provides detection information on an object around the subject vehicle to the driving support ECU 50*a*, the autonomous driving ECU 50*b*, and the like.

The locator 35 includes a global navigation satellite system (GNSS) receiver, an inertial sensor, and the like. The locator 35 combines positioning signals received from multiple positioning satellites by the GNSS receiver, a measurement result of the inertial sensor, vehicle speed information output to the communication bus 99, and the like, and sequentially measures a subject vehicle position, a traveling direction, and the like of the subject vehicle Am. The locator 35 includes a map database (hereinafter, map DB) 36 that stores three-dimensional map data and two-dimensional map data. The three-dimensional map data is a so-called high definition (HD) map, and includes road information necessary for autonomous travel control. Specifically, three-dimensional shape information of a road, detailed information of each lane, and the like are included in the three-dimensional map data. The locator 35 can update the three-dimensional map data and the two-dimensional map data to the latest information by external communication using the in-vehicle communication device 39. The locator 35 reads map data on the surroundings of a current position from the map DB 36, and provides the read map data together with subject vehicle position information and direction information of the subject vehicle Am to the driving support ECU 50*a*, the autonomous driving ECU 50*b*, and the like as locator information.

The navigation ECU 38 acquires information on a destination specified by an occupant such as the driver, based on operation information acquired from the HCU 100. The navigation ECU 38 acquires the subject vehicle position information and the direction information from the locator 35 and sets a route from the current position to the destination. The navigation ECU 38 provides route information indicating the set route to the destination to the driving support ECU 50*a*, the autonomous driving ECU 50*b*, the HCU 100, and the like. The navigation ECU 38 coordinates with an HMI system 10, combines screen display, voice messages, and the like as route guidance to the destination, and notifies the driver of the traveling direction of the subject vehicle Am at an intersection, a branching point, and the like.

Here, a user terminal such as a smartphone may be connected to the in-vehicle network 1 or the HCU 100. The user terminal may provide the subject vehicle position information, the direction information, the map data, and the like to the driving support ECU 50*a*, the autonomous driving ECU 50*b*, and the like in place of the locator 35. Further, the user terminal may provide the route information to the destination to the driving support ECU 50*a*, the autonomous driving ECU 50*b*, the HCU 100, and the like in place of the navigation ECU 38.

The in-vehicle communication device 39 is an external communication unit mounted on the subject vehicle Am, and functions as a vehicle to everything (V2X) communication device. The in-vehicle communication device 39 transmits and receives information by wireless communication to and from a roadside device provided at the roadside. As an example, the in-vehicle communication device 39 receives traffic congestion information, road construction information, accident information, and the like around the current position and in the traveling direction of the subject vehicle Am (for example, a merging area CfA described later) from the roadside device. The traffic congestion information, the road construction information, the accident information, and the like are VICS (registered trademark) information and the like. The in-vehicle communication device 39 provides the received information to the autonomous driving ECU 50*b*, the HCU 100, and the like.

The travel control ECU 40 is an electronic control device mainly including a microcontroller. The travel control ECU 40 has at least functions of a brake control ECU, a drive control ECU, and a steering control ECU. The travel control ECU 40 continuously performs braking force control of each wheel, output control of an in-vehicle power source, and steering angle control based on any one of an operation command based on a driving operation of the driver, a control command of the driving support ECU 50*a*, and a control command of the autonomous driving ECU 50*b*.

The HCU 100 constitutes the human machine interface (HMI) system 10 together with multiple display devices, an audio device 24, an ambient light 25, an operation device 26, and the like. The HMI system 10 has an input interface function of receiving an operation performed by an occupant such as the driver of the subject vehicle Am, and an output interface function of presenting information to the driver.

The display device presents information through the visual sense of the driver by image display or the like. The display device includes a meter display 21, a CID 22, a head-up display (hereinafter referred to as HUD) 23, and the like. The CID 22 has a function of a touch panel, and detects a touch operation on a display screen performed by the driver or the like.

The audio device 24 includes multiple speakers installed in a vehicle interior in a manner of surrounding a driver's seat, and causes the speakers to reproduce a notification sound, a voice message, or the like in the vehicle interior. The ambient light 25 is provided on an instrument panel, a steering wheel, and the like. The ambient light 25 presents information using a peripheral visual field of the driver by ambient display that changes an emission color.

The operation device 26 is an input unit configured to receive a user operation performed by the driver or the like. For example, user operations related to activation and stop of the autonomous driving function are input to the operation device 26. As an example, a driver input instructing a transition from the driving support control to the autonomous travel control is input to the operation device 26. The operation device 26 includes a steering switch provided on a spoke portion of the steering wheel, an operation lever provided on a steering column portion, a voice input device for recognizing utterance contents of the driver, and the like.

The HCU 100 functions as a presentation control device and integrally controls presentation of information related to autonomous driving or the like to the driver. The HCU 100 requests the driver to shift to driving, based on an execution request for a driving operation based on the autonomous driving ECU 50*b*. In addition, the HCU 100 can coordinate with the autonomous driving ECU 50*b* to allow the driver performing the second task, and reproduce video contents and the like related to the second task in a manner that does not interfere with a driving takeover request.

The HCU 100 is a computer mainly including a control circuit. The control circuit includes a processing unit 11, a RAM 12, a storage unit 13, an input and output interface 14, a bus connecting these units, and the like. The processing unit 11 executes various types of processing for presentation control processing by accessing the RAM 12. The RAM 12 may include a video RAM for generating video data. The storage unit 13 includes a nonvolatile storage medium. The storage unit 13 stores various programs (such as a presentation control program) to be executed by the processing unit 11. The HCU 100 constructs multiple functional units by the processing unit 11 executing the programs stored in the storage unit 13. Functional units such as an information acquisition unit 81, an information coordination unit 82, and a presentation control unit 88 are constructed in the HCU 100 (see FIG. 3).

The information acquisition unit 81 acquires operation information indicating contents of a user operation from the CID 22, the operation device 26, and the like. The information acquisition unit 81 provides operation information on a user operation related to the autonomous driving function to the autonomous driving ECU 50*b* through the information coordination unit 82. The information acquisition unit 81 provides operation information on a user operation for setting a destination of the subject vehicle Am to the navigation ECU 38.

The information coordination unit 82 coordinates with an information coordination unit 61 (described later) of the autonomous driving ECU 50*b* and enables sharing of information between the autonomous driving system 50 and the HCU 100. The information coordination unit 82 provides the operation information and the like grasped by the information acquisition unit 81 to the autonomous driving ECU 50*b*. In addition, the information coordination unit 82 grasps an operating state of the autonomous driving based on the autonomous driving system 50 by acquiring control status information indicating a state of the autonomous driving function. Further, the information coordination unit 82 acquires an execution request for performing notification to the driver such as a driving takeover request from the autonomous driving ECU 50*b*.

Figure 7:
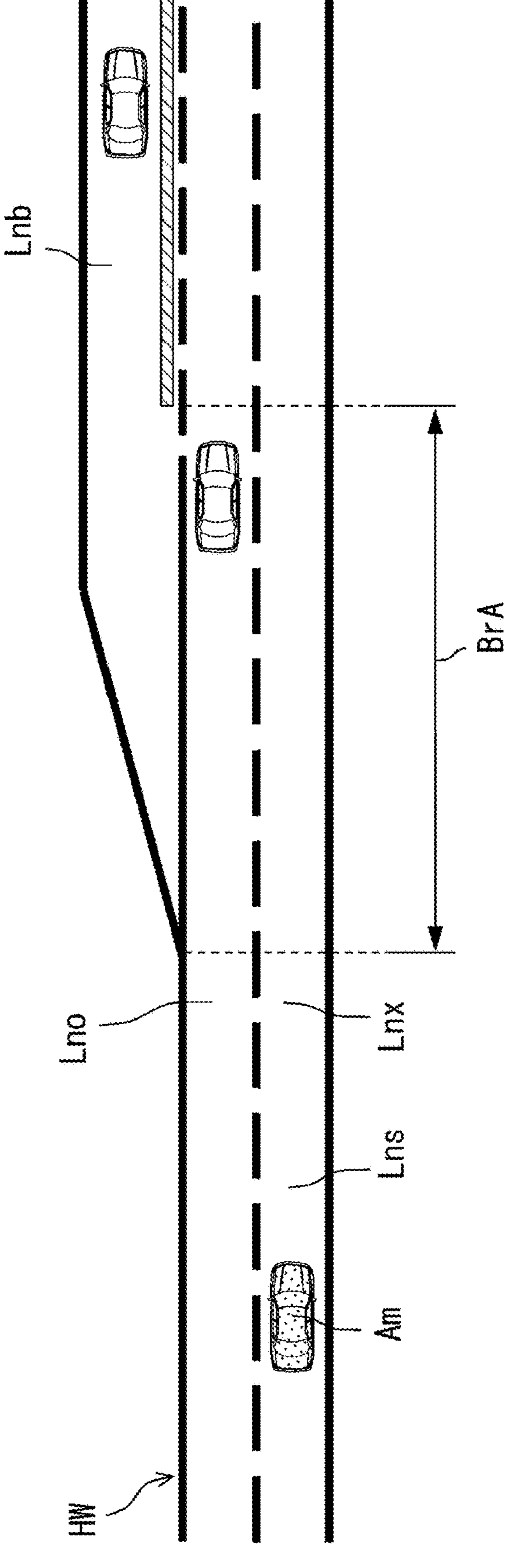
FIG. 7 is a diagram illustrating an example of a scene of approaching a branching area.
Figure 8:
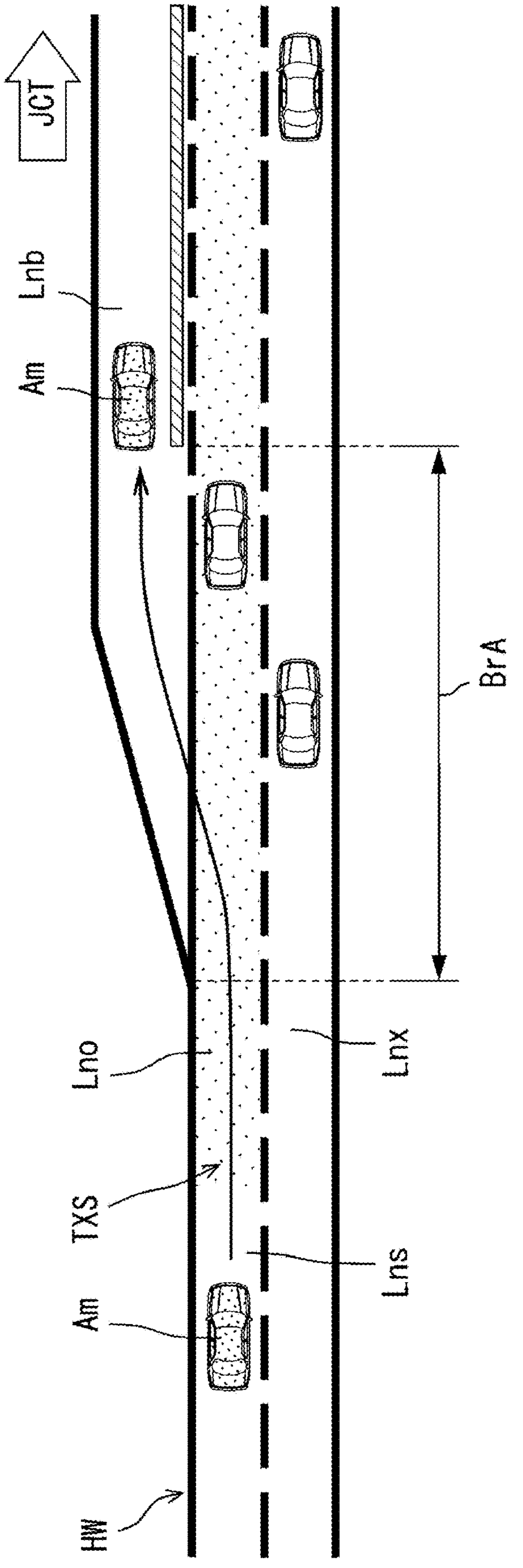
FIG. 8 is a diagram illustrating another example of the scene of approaching a branching area.
Figure 9:
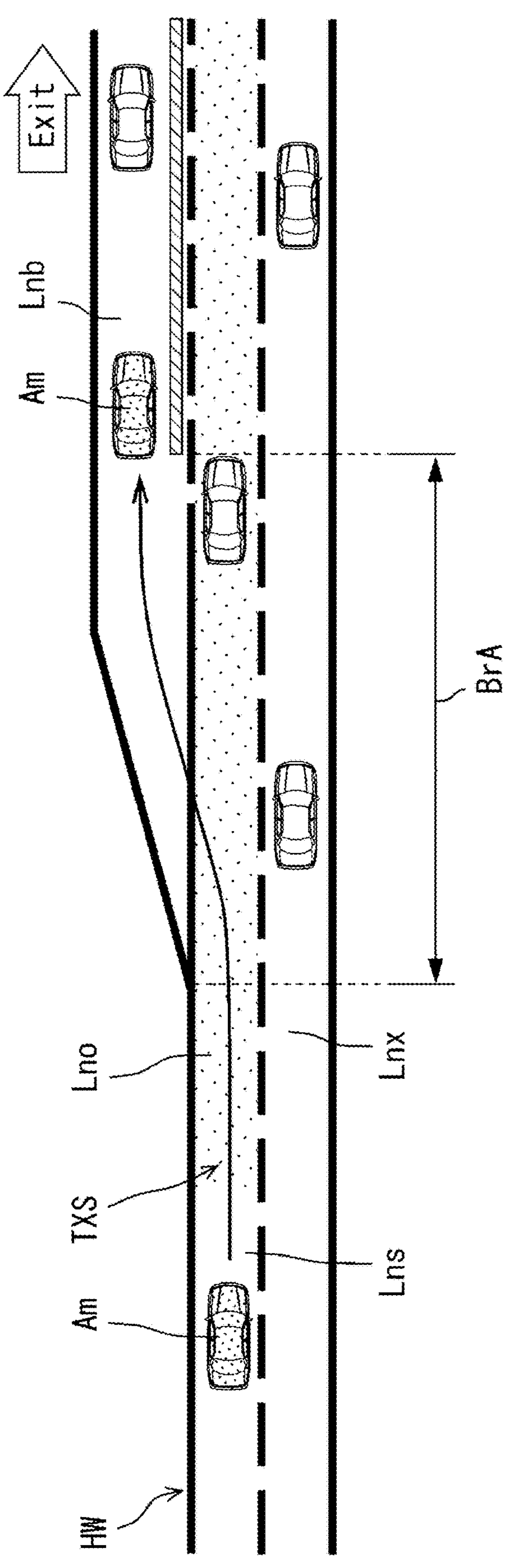
FIG. 9 is a diagram illustrating still another example of the scene of approaching a branching area.

The presentation control unit 88 integrally provides information to the driver using the display devices, the audio device 24, the ambient light 25, and the like. The presentation control unit 88 performs content provision and information presentation in accordance with the operating state of the autonomous driving, based on the control status information and the execution request acquired by the information coordination unit 82. For example, the presentation control unit 88 performs notification in the merging area CfA (see FIGS. 4 to 6 and 10 to 14) and a branching area BrA (see FIGS. 7 to 9) to be described later, based on the execution request from the autonomous driving ECU 50*b*.

Next, details of the driving support ECU 50*a* and the autonomous driving ECU 50*b* will be described in order.

The driving support ECU 50*a* is a computer mainly including a control circuit. The control circuit includes a processing unit, a RAM, a storage unit, an input and output interface, a bus connecting these units, and the like. The driving support ECU 50*a* implements driving support functions such as adaptive cruise control (ACC), lane trace control (LTC) and lane change assist (LCA) by the processing unit executing programs. As an example, the driving support ECU 50*a* performs driving support control for causing the subject vehicle Am to travel along a subject vehicle lane Lns, in which the subject vehicle Am is traveling, by coordination of the functions of the ACC and the LTC.

The autonomous driving ECU 50*b* has a greater arithmetic capacity than the driving support ECU 50*a*, and can perform at least travel control corresponding to the ACC, the LTC, and the like. The autonomous driving ECU 50*b* is a computer mainly including a control circuit. The control circuit includes a processing unit 51, a RAM 52, a storage unit 53, an input and output interface 54, a bus connects these units, and the like. The processing unit 51 accesses the RAM 52 to execute various types of processing for implementing an autonomous driving control method according to the present disclosure. The storage unit 53 stores various programs (such as an autonomous driving control program) to be executed by the processing unit 51. By the execution of the programs by the processing unit 51, the information coordination unit 61, an environment recognition unit 62, an action determination unit 63, a control execution unit 64, and the like are constructed in the autonomous driving ECU 50*b* as multiple functional units for implementing the autonomous driving function (see FIG. 2).

The information coordination unit 61 provides information to the information coordination unit 82 of the HCU 100 and acquires information from the information coordination unit 82. By coordination of the information coordination units 61 and 82, the autonomous driving ECU 50*b* and the HCU 100 share information acquired by each other. The information coordination unit 61 generates control status information indicating an operating state of the autonomous driving function and provides the generated control status information to the information coordination unit 82. In addition, the information coordination unit 61 enables the HCU 100 to perform notification in synchronization with the operating state of the autonomous driving function, by outputting an execution request for notification to the information coordination unit 82. Meanwhile, the information coordination unit 61 acquires operation information of the driver and the like from the information coordination unit 82. The information coordination unit 61 grasps contents of a user operation input to the HMI system 10 or the like, based on the operation information.

The environment recognition unit 62 combines the locator information acquired from the locator 35, the received information acquired from the in-vehicle communication device 39, and the detection information acquired from the surroundings monitoring sensor 30, and recognizes a traveling environment of the subject vehicle Am. The environment recognition unit 62 includes a road information grasping unit 72 and a subject vehicle state grasping unit 73 as sub-function units related to traveling environment recognition.

The road information grasping unit 72 grasps information related to a road on which the subject vehicle Am travels. The road information grasping unit 72 uses the locator information and the route information to specify a road on which the subject vehicle Am travels or a road on which the subject vehicle Am is scheduled to travel. The road information grasping unit 72 determines whether the road on which the subject vehicle Am travels or the road on which the subject vehicle Am is scheduled to travel is a specific autonomous-driving-allowed area (hereinafter, referred to as an AD area) set in advance. The AD area is a road for which the three-dimensional map data (HD map) is prepared, and specifically, is set to a highway HW (see FIGS. 4 to 14) including a national expressway, an automobile road and the like. The highway HW is a road where a vehicle that can travel thereon is restricted, an intersection or the like is not present, and inflow from a general road and outflow to the general road are restricted.

The road information grasping unit 72 grasps whether there is a lane-increased area where the number of lanes increases in the traveling direction of the subject vehicle Am, in a period in which the subject vehicle Am travels on a main vehicular lane of the highway HW according to the autonomous travel control. A lane increase/reduction area includes the merging area CfA (see FIGS. 4 to 6) and the branching area BrA (see FIGS. 7 to 9). Further, the road information grasping unit 72 grasps presence of the merging area CfA (see FIGS. 10 to 14) located in the traveling direction of the subject vehicle Am also in a period in which the subject vehicle Am travels on a ramp way or junction connected to the main vehicular lane according to the autonomous travel control.

The merging area CfA is a section where a merging lane Lnc and a climbing lane are connected to the main vehicular lane of the highway HW. In scenes illustrated in FIGS. 4 to 6, the subject vehicle Am is traveling on a main vehicular lane to which the merging lane Lnc is connected. On the other hand, in scenes illustrated in FIGS. 10 to 14, the subject vehicle Am is traveling on the merging lane Lnc connected to a main vehicular lane. The merging lane Lnc corresponds to an acceleration lane in which a vehicle merging into the main vehicular lane accelerates. A point where a lane change between the merging lane Lnc or the climbing lane and the main vehicular lane can be performed is a start point of the merging area CfA.

The merging area CfA can be classified into two types. In one merging area CfA, the merging lane Lnc and the climbing lane end at a predetermined distance. In this case (see FIGS. 4 and 10 and the like), ends of the merging lane Lnc and the climbing lane are end points of the merging area CfA. On the other hand, in the other merging area CfA, the merging lane Lnc or the like becomes one lane of main vehicular lanes as it is (see FIGS. 5 and 11 and the like). In this case, for convenience, a point at a predetermined distance (for example, about several hundred meters to 1 km) from the start point is set as the end point of the merging area CfA.

The road information grasping unit 72 grasps a road shape of the merging area CfA before reaching the merging area CfA. As in the case of the one merging area CfA described above, when the merging lane Lnc or the climbing lane disappears, in other words, when the number of lanes once increased returns to the number before the increase, the road information grasping unit 72 determines that the merging area CfA has a road shape in which the number of lanes decreases. On the other hand, as in the case of the other merging area CfA described above, when the merging lane Lnc or the climbing lane becomes one lane of the main vehicular lanes as it is, that is, when the number of lanes increased is maintained, the road information grasping unit 72 determines that the merging area CfA has a road shape in which the number of lanes does not decrease.

The branching area BrA (see FIGS. 7 to 9) is a section where a branch lane Lnb occurs on a road on which the subject vehicle Am travels. The branch lane Lnb is a lane that branches off from the main vehicular lane of the highway HW for which the AD area is set, and corresponds to a deceleration lane in which a vehicle that leaves the main vehicular lane decelerates. A point at which a lane change between the branch lane Lnb and the main vehicular lane can be performed is a start point of the branching area BrA. A point where the lane change between the branch lane Lnb and the main vehicular lane cannot be performed is an end point of the branching area BrA.

The road information grasping unit 72 grasps a type of the end of the branch lane Lnb and determines whether the end of the branch lane Lnb is the AD area. When the road information grasping unit 72 grasps that an exit from the highway HW to a general road, a service area, a parking area, or the like is at the end of the branch lane Lnb, the road information grasping unit 72 determines that the end of the branch lane Lnb is an MD area. On the other hand, when it is grasped that the end of the branch lane Lnb is another highway HW, that is, when the branch lane Lnb is a junction toward another highway HW, the road information grasping unit 72 determines that the end of the branch lane Lnb is the AD area.

The subject vehicle state grasping unit 73 grasps a traveling state of the subject vehicle Am. The subject vehicle state grasping unit 73 grasps traffic congestion around the subject vehicle Am by combining information indicating relative positions and relative speeds of other vehicles around the subject vehicle and vehicle speed information indicating a current traveling speed of the subject vehicle Am. As an example, when the current traveling speed of the subject vehicle Am is equal to or lower than a traffic congestion speed (for example, about 30 km/h) and there are other vehicles traveling in front of and behind the subject vehicle Am in the same lane as the subject vehicle Am, the subject vehicle state grasping unit 73 determines that the surroundings of the subject vehicle Am are in a traffic congestion state.

Figure 12:
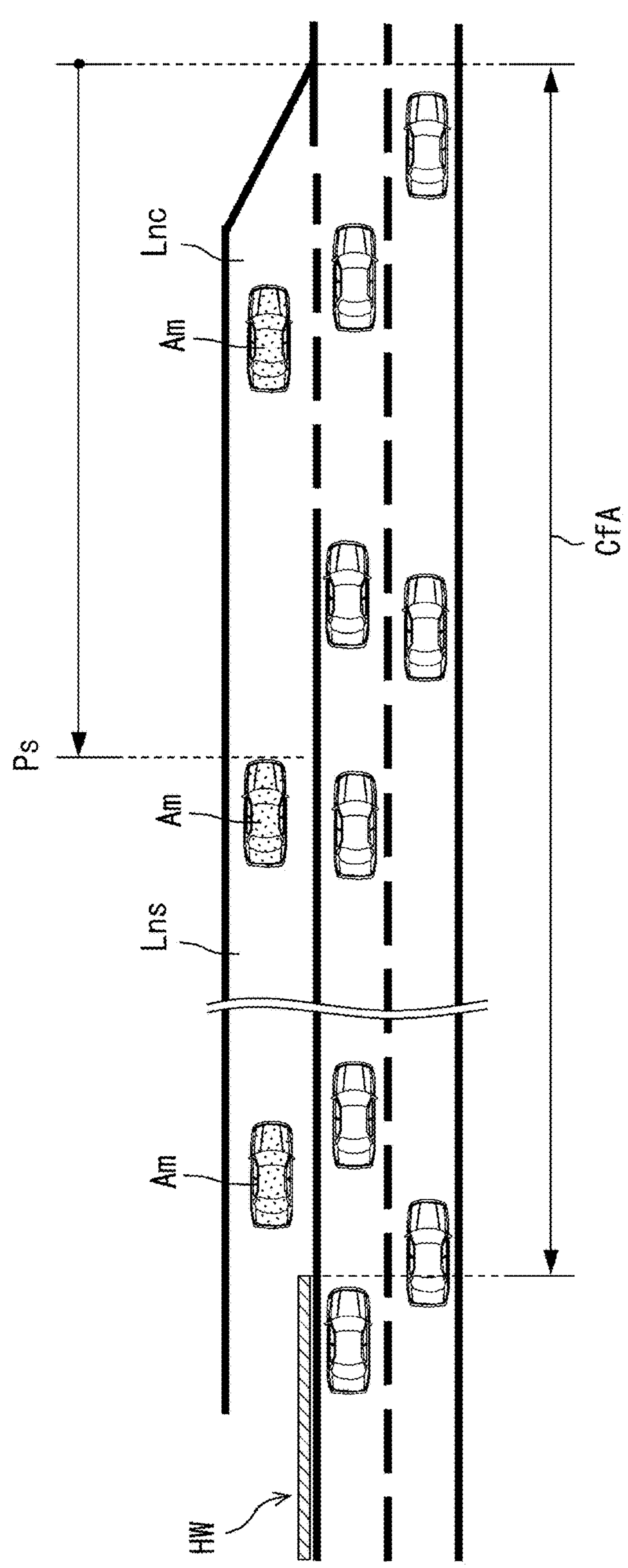
FIG. 12 is a diagram illustrating a scene in which a lane change to a main vehicular lane at a merging area cannot be performed.
Figure 13:
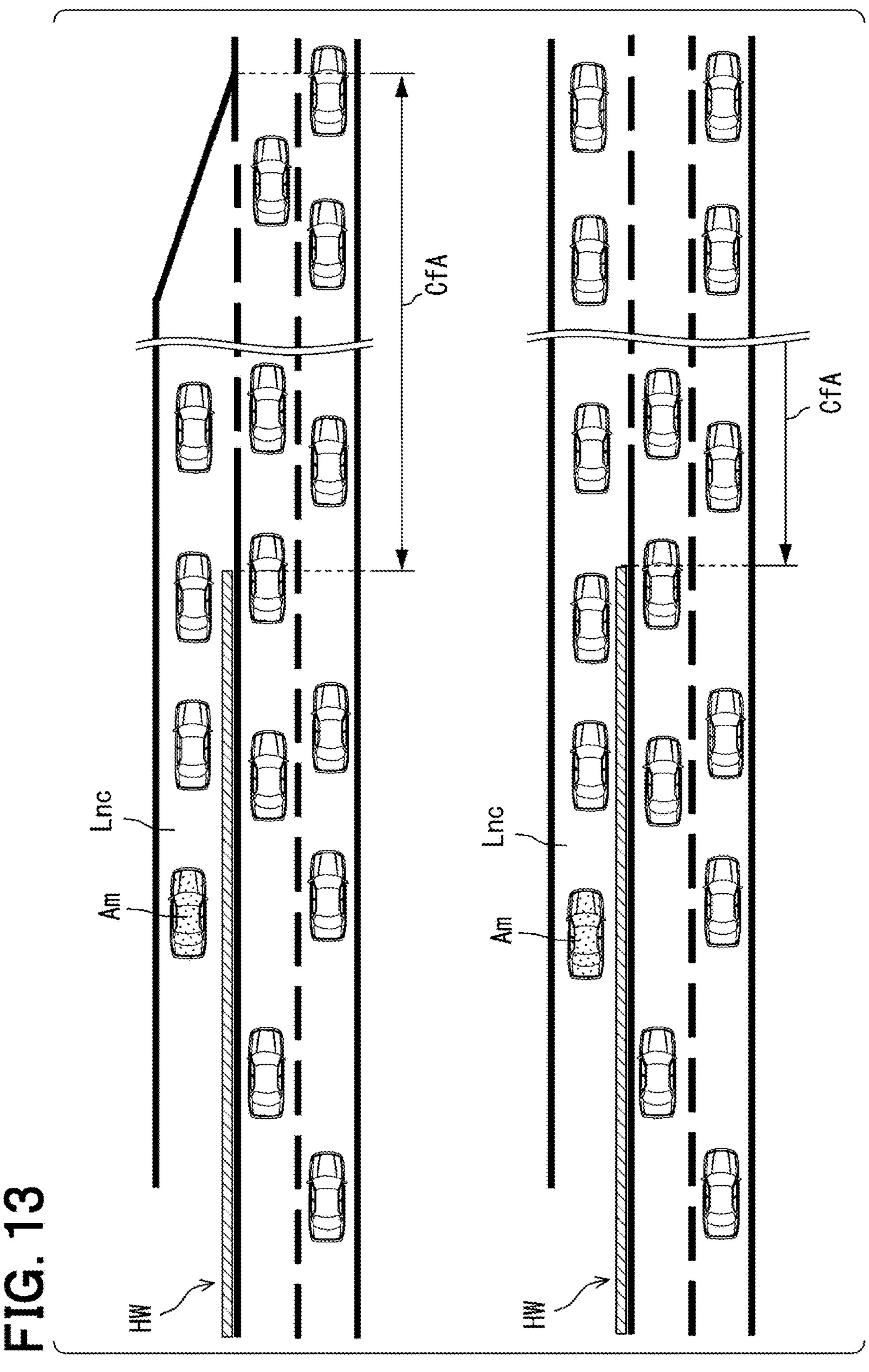
FIG. 13 is a diagram illustrating a merging scene when a merging lane is congested.

In addition, when the subject vehicle Am is traveling in the merging lane Lnc, the subject vehicle state grasping unit 73 grasps occurrence of traffic congestion in the merging lane Lnc and the main vehicular lane (see FIGS. 12 and 13). The subject vehicle state grasping unit 73 may grasp traffic congestion occurring in the merging area CfA before reaching the merging area CfA based on the traffic congestion information received by the in-vehicle communication device 39.

When the subject vehicle Am is traveling on a road including multiple lanes, the subject vehicle state grasping unit 73 grasps a position of the subject vehicle lane Lns in which the subject vehicle Am is traveling among the multiple lanes by combining the locator information, detection information on lane markings, and the like. When the presence of the merging area CfA in the traveling direction is grasped by the road information grasping unit 72, the subject vehicle state grasping unit 73 determines whether the subject vehicle lane Lns is a lane adjacent to the merging lane Lnc (hereinafter, referred to as an adjacent lane Lno, see FIG. 4 and the like). In addition, when the presence of the branching area BrA in the traveling direction is grasped by the road information grasping unit 72, the subject vehicle state grasping unit 73 determines whether the subject vehicle lane Lns is the adjacent lane Lno (see FIG. 7 and the like) adjacent to the branch lane Lnb. When the subject vehicle lane Lns is the adjacent lane Lno adjacent to the branch lane Lnb (see FIGS. 8 and 9), the subject vehicle state grasping unit 73 further refers to the route information and grasps whether a scheduled route of the subject vehicle Am is set to the branch lane Lnb.

In addition, in a case of a road shape in which multiple merging lanes Lnc merge with the main vehicular lane in the merging area CfA (see FIG. 14), the subject vehicle state grasping unit 73 grasps the position of the subject vehicle lane Lns in which the subject vehicle Am travels among the multiple merging lanes Lnc. Specifically, the subject vehicle state grasping unit 73 determines whether the merging lane Lnc adjacent to the main vehicular lane (hereinafter, referred to as an adjacent merging lane Lnc1) is the subject vehicle lane Lns or the merging lane Lnc separated from the main vehicular lane (hereinafter, referred to as a separated merging lane Lnc2) is the subject vehicle lane Lns.

The action determination unit 63 determines feasibility of execution of the autonomous travel control on the subject vehicle Am, and controls the operating state of the autonomous driving function. The action determination unit 63 permits execution of the autonomous travel control on a road in the AD area. On the other hand, on a road in the manual driving area (hereinafter, referred to as the MD area) that is not included in the AD area, the action determination unit 63 basically prohibits traveling performed according to the autonomous travel control. For example, a general road for which three-dimensional map data (HD map) is not prepared corresponds to the MD area. Further, even in the AD area, a road section for which the road construction information and the accident information are set is set as the MD area (prohibition area) in which traveling with the autonomous travel control is prohibited. The action determination unit 63 coordinates with the driving support ECU **50*a* and the HCU 100 at the start and end of the autonomous travel control, and controls the driving takeover between the autonomous driving system 50** and the driver.

The action determination unit 63 includes a control switching unit 77 as a sub-function unit for controlling the operating state of the autonomous driving function. The control switching unit 77 coordinates with the driving support ECU **50*a* and switches between the driving support control in which the driver has a surroundings monitoring obligation and the autonomous travel control in which the driver has no surroundings monitoring obligation. Specifically, when the autonomous driving (autonomous travel control) of Level 3 cannot be continued, the control switching unit 77** performs switching to hands-off or hands-on autonomous driving at Level 2 or lower (driving support control), manual driving, or the like. The switching from the autonomous travel control to the driving support control or the like is a control transition of lowering the autonomous driving level, and is a change to a driving control state having a high dependency on the driver. On the other hand, the switching from the driving support control to the autonomous travel control is a control transition of raising the autonomous driving level, and is a change to a driving control state having a low dependency on the driver.

When the execution of the autonomous travel control is permitted, the control switching unit 77 switches a control mode of the autonomous travel control between multiple control modes. The control modes of the autonomous travel control include at least area limited control (hereinafter, referred to as an area level 3) performed only in the AD area and traffic congestion limited control (hereinafter, referred to as a traffic congestion scene level 3) performed only for traveling during traffic congestion in the AD area.

When the autonomous driving ECU 50*b* has a control right of the driving operation, the action determination unit 63 generates a scheduled traveling line, along which the subject vehicle Am travels, based on a recognition result of the traveling environment obtained by the environment recognition unit 62. The action determination unit 63 outputs the generated scheduled traveling line to the control execution unit 64.

When the autonomous driving ECU 50*b* has the control right of the driving operation, the control execution unit 64 executes, in coordination with the travel control ECU 40, acceleration and deceleration control, steering control, and the like of the subject vehicle Am in accordance with the scheduled traveling line generated by the action determination unit 63. Specifically, the control execution unit 64 generates control commands based on the scheduled traveling line, and sequentially outputs the generated control commands to the travel control ECU 40.

The autonomous travel control executed by the autonomous driving ECU 50*b* described above may be restricted in scenes of traveling in the merging area CfA and the branching area BrA described above. Hereinafter, details of the autonomous driving control in the merging area CfA and the branching area BrA will be further described based on FIGS. 4 to 14 with reference to FIGS. 1 to 3.

<Autonomous Driving Control in Merging Area CfA>

When the subject vehicle Am traveling with the autonomous travel control is approaching the merging area CfA, the action determination unit 63 determines whether to continue the autonomous travel control, according to the position of the subject vehicle lane Lns, the road shape of the merging area CfA, and the control mode of the autonomous travel control being executed.

When the subject vehicle Am is traveling in the main vehicular lane and the subject vehicle lane Lns is a non-adjacent lane Lnx, the action determination unit 63 permits continuation of the autonomous travel control being executed. The non-adjacent lane Lnx is a lane that is not adjacent to the merging lane Lnc or the like, and is a lane that is located on an opposite side of the merging lane Lnc or the like across the adjacent lane Lno. When the subject vehicle Am is traveling in the non-adjacent lane Lnx, the action determination unit 63 can permit continuation of the autonomous travel control regardless of the road shape of the merging area CfA and the control mode of the autonomous travel control.

When the subject vehicle lane Lns is the adjacent lane Lno, the action determination unit 63 determines whether to continue the autonomous travel control, according to the road shape of the merging area CfA, more specifically, according to whether the merging area CfA has a road shape in which the number of lanes decreases. When the merging area CfA has a road shape in which the number of lanes decreases (see FIG. 4), the action determination unit 63 restricts the continuation of the autonomous travel control. When the end of merging lane Lnc is grasped, the action determination unit 63 determines to interrupt the autonomous travel control regardless of the control mode of the autonomous travel control being executed. In this case, the action determination unit 63 sets a restriction section TXS (see FIGS. 4 to 6), in which the execution of the autonomous travel control is restricted, in the adjacent lane Lno.

The restriction section TXS is set in a range including the merging area CfA. A start point of the restriction section TXS is set to a near side (subject vehicle side) of the start point of the merging area CfA. Specifically, the start point of the restriction section TXS is set to a point that is at the near side of the start point of the merging area CfA by about 500 m, or a point that is about 15 seconds from reaching the start point of the merging area CfA. The end point of the restriction section TXS is set to a point substantially the same as the end point of the merging area CfA, or a point slightly at a back side of the end point of the merging area CfA.

When the action determination unit 63 determines to interrupt the autonomous travel control, the control switching unit 77 performs switching from the autonomous travel control to the hands-off driving support control after the subject vehicle Am enters the restriction section TXS. At this time, the information coordination unit 61 coordinates with the HCU 100 and, before the control transition, requests the driver to restart the surroundings monitoring. In addition, when the environment recognition unit 62 grasps a parallel traveling vehicle traveling in the merging lane Lnc (hereinafter, referred to as a merging vehicle Ac), the control switching unit 77 performs switching from the hands-off driving support control to the hands-on driving support control. At this time, the information coordination unit 61 coordinates with the HCU 100 and, before the control transition, requests the driver to restart gripping of the steering wheel.

When the subject vehicle lane Lns is the adjacent lane Lno and the merging area CfA has a road shape in which the number of lanes does not decrease (see FIGS. 5 and 6), the action determination unit 63 determines, according to the control mode being executed, whether to continue the autonomous travel control. When the merging area CfA has a road shape in which the number of lanes does not decrease and the control mode being executed is the traffic congestion scene level 3 (see FIG. 5), the action determination unit 63 permits the continuation of the autonomous travel control. Accordingly, the subject vehicle Am passes through the restriction section TXS while continuing the autonomous driving according to the traffic congestion scene level 3.

Figure 5:
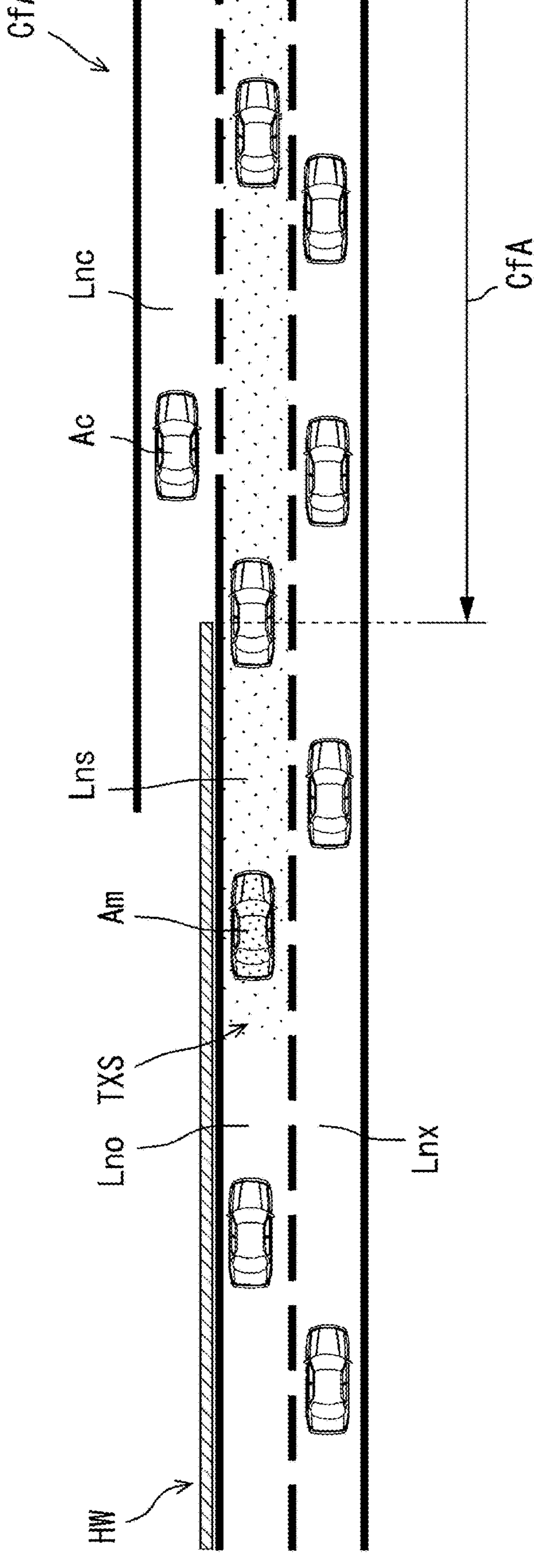
FIG. 5 is a diagram illustrating another example of the scene of approaching a merging area.
Figure 6:
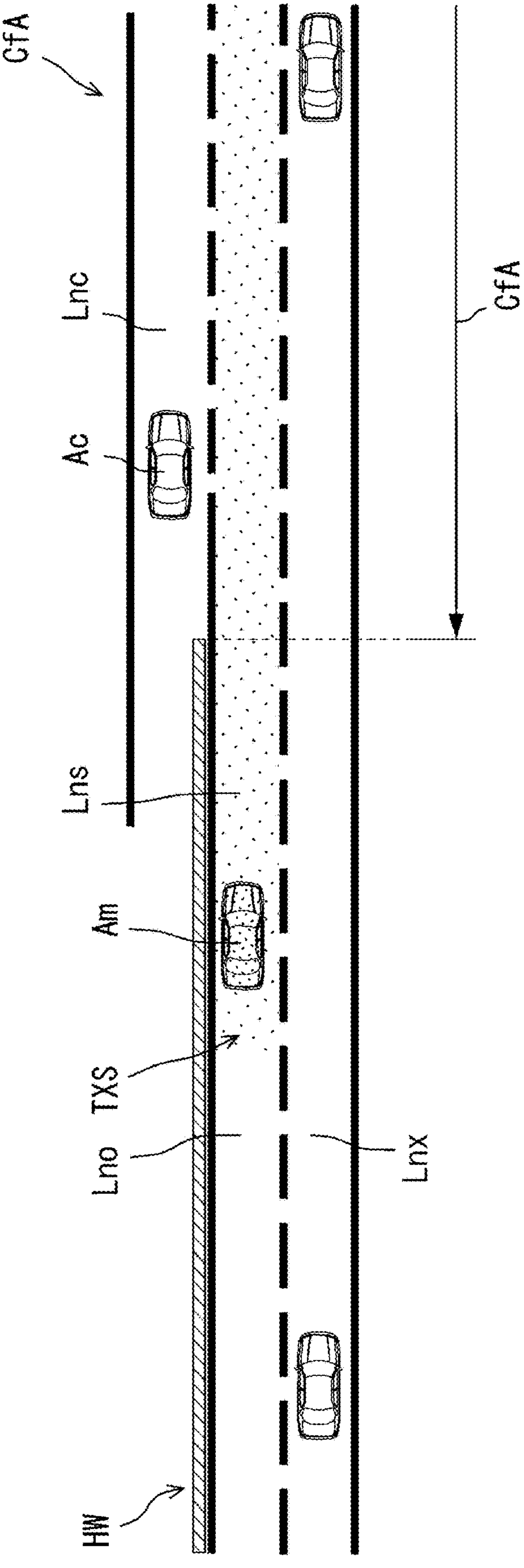
FIG. 6 is a diagram illustrating still another example of the scene of approaching a merging area.

When the merging vehicle Ac that attempts to merge into the subject vehicle lane Lns is recognized by the environment recognition unit 62 during traveling in the restriction section TXS, the action determination unit 63 also continues autonomous travel according to the traffic congestion scene level 3 (see FIG. 5). In this case, the information coordination unit 61 coordinates with the HCU 100 and performs merging vehicle notification indicating presence of the merging vehicle Ac. The merging vehicle notification is performed using, for example, a status image constantly displayed on the meter display 21. The status image is formed with a subject vehicle icon as a center. The merging vehicle notification is performed by a display change in which an other-vehicle icon indicating the merging vehicle Ac and a line icon indicating a lane marking between the merging lane Lnc and the subject vehicle lane Lns are added to the status image. The driver can grasp occurrence of the merging lane Lnc from the other-vehicle icon and the line icon displayed in association with the subject vehicle icon.

Even in the case where the merging area CfA has a road shape in which the number of lanes does not decrease, when the control mode being executed is the area level 3 (see FIG. 6), the action determination unit 63 restricts the continuation of the autonomous travel control. Also in this case, the control switching unit 77 performs switching from the autonomous travel control to the hands-off driving support control after the subject vehicle Am enters the restriction section TXS. At this time, prior to the transition to the hands-off driving support control, the information coordination unit 61 requests the driver to restart the surroundings monitoring. The control switching unit 77 performs switching from the hands-off driving support control to the hands-on driving support control based on grasping of the merging vehicle Ac that attempts to merge into the subject vehicle lane Lns. At this time, prior to the transition to the hands-on driving support control, the information coordination unit 61 requests the driver to restart the gripping of the steering wheel.

<Autonomous Driving Control in Branching Area BrA>

When the subject vehicle Am traveling in the main vehicular lane according to the autonomous travel control is approaching the branching area BrA, the action determination unit 63 determines, according to the position of the subject vehicle lane Lns, whether to continue the autonomous travel control. When the subject vehicle lane Lns is the non-adjacent lane Lnx (see FIG. 7), the action determination unit 63 permits the continuation of the autonomous travel control being executed. The non-adjacent lane Lnx is a lane that is not adjacent to the branch lane Lnb or the like, and is a lane that is located on an opposite side of the branch lane Lnb across the adjacent lane Lno. The subject vehicle Am traveling in the non-adjacent lane Lnx passes through the branching area BrA while continuing the autonomous travel according to the area level 3 or the traffic congestion scene level 3.

When the subject vehicle lane Lns is the adjacent lane Lno (see FIGS. 8 and 9), the action determination unit 63 restricts the continuation of the autonomous travel control. When the subject vehicle Am is traveling in the adjacent lane Lno, the action determination unit 63 sets the restriction section TXS of the autonomous travel control in a range including the branching area BrA in the adjacent lane Lno. Similarly to case of the merging area CfA, a start point of the restriction section TXS is set to a point at a near side of the start point of the branching area BrA by about 500 m, or a point that is about 15 seconds from reaching the start point of the branching area BrA. An end point of the restriction section TXS is set to a point at a back side of the end point of the branching area BrA by a predetermined distance (for example, about several tens of meters).

When the subject vehicle lane Lns is the adjacent lane Lno, the action determination unit 63 determines whether the scheduled route of the subject vehicle Am is set to the branch lane Lnb. When the scheduled route of the subject vehicle Am is not set to the branch lane Lnb but is set to the main vehicular lane, the control switching unit 77 performs switching from the autonomous travel control to the hands-off driving support control after the subject vehicle Am enters the restriction section TXS. At this time, the information coordination unit 61 coordinates with the HCU 100 and, before the control transition, requests the driver to restart the surroundings monitoring.

When the scheduled route of the subject vehicle Am is set to the branch lane Lnb, the action determination unit 63 determines whether the end of the branch lane Lnb is an exit from the highway HW. When it is determined that the end of the branch lane Lnb is not an exit from the highway HW and the branch lane Lnb is a junction (see FIG. 8), the action determination unit 63 permits traveling performed in the branch lane Lnb according to the driving support control. On the other hand, when it is determined that the end of the branch lane Lnb is an exit from the highway HW (see FIG. 9), the action determination unit 63 determines to perform the driving takeover to the driver while in the main vehicular lane.

The control switching unit 77 refers to the determination result of the action determination unit 63, and changes contents of the travel control of the subject vehicle Am after the autonomous travel control is ended according to whether the end of the branch lane Lnb is an exit from the highway HW. Specifically, when the end of the branch lane Lnb is not an exit from the highway HW (see FIG. 8), the control switching unit 77 switches from the autonomous travel control to the hands-on driving support control, in which the driver has a surroundings monitoring obligation, after entering the restriction section TXS. In addition, prior to the transition to the hands-on driving support control, the information coordination unit 61 requests the driver to restart the surroundings monitoring and the gripping of the steering wheel. Then, the driver who has restarted the surroundings monitoring and the gripping of the steering wheel performs a lane change from the adjacent lane Lno to the branch lane Lnb using the function of the LCA, and causes the subject vehicle Am to travel along the branch lane Lnb using the functions of the ACC and the LTC.

On the other hand, when the end of the branch lane Lnb is an exit from the highway HW (see FIG. 9), the control switching unit 77 switches from the autonomous travel control to the manual driving performed by the driver. In this case, before the subject vehicle Am enters the restriction section TXS, the information coordination unit 61 coordinates with the HCU 100 and issues an advance notice of driving takeover to the driver. After the subject vehicle Am enters the restriction section TXS, the action determination unit 63 starts a process of driving takeover to the driver. As described above, the driver performs the lane change from the adjacent lane Lno to the branch lane Lnb after gaining the control right of the driving operation in the main vehicular lane, and causes the subject vehicle Am to travel along the branch lane Lnb.

<Autonomous Driving Control in Scene of Merging of Subject Vehicle>

When the subject vehicle Am is traveling in the merging lane Lnc according to the autonomous travel control and is approaching the merging area CfA, the action determination unit 63 changes the driving control state of the subject vehicle Am according to the road shape of the merging area CfA, presence or absence of traffic congestion, the position of the subject vehicle lane Lns, and the like. The action determination unit 63 alters a change degree of the autonomous driving level in a case where the number of lanes decreases in the merging area CfA (see FIG. 10) and a case where the number of lanes does not decrease (see FIG. 11). The action determination unit 63 changes the driving control state to a state having a higher dependency on the driver by lowering the autonomous driving level when the merging area CfA has a road shape in which the merging lane Lnc narrows (ends) than when the merging area CfA has a road shape in which the merging lane Lnc does not narrow.

Figure 10:
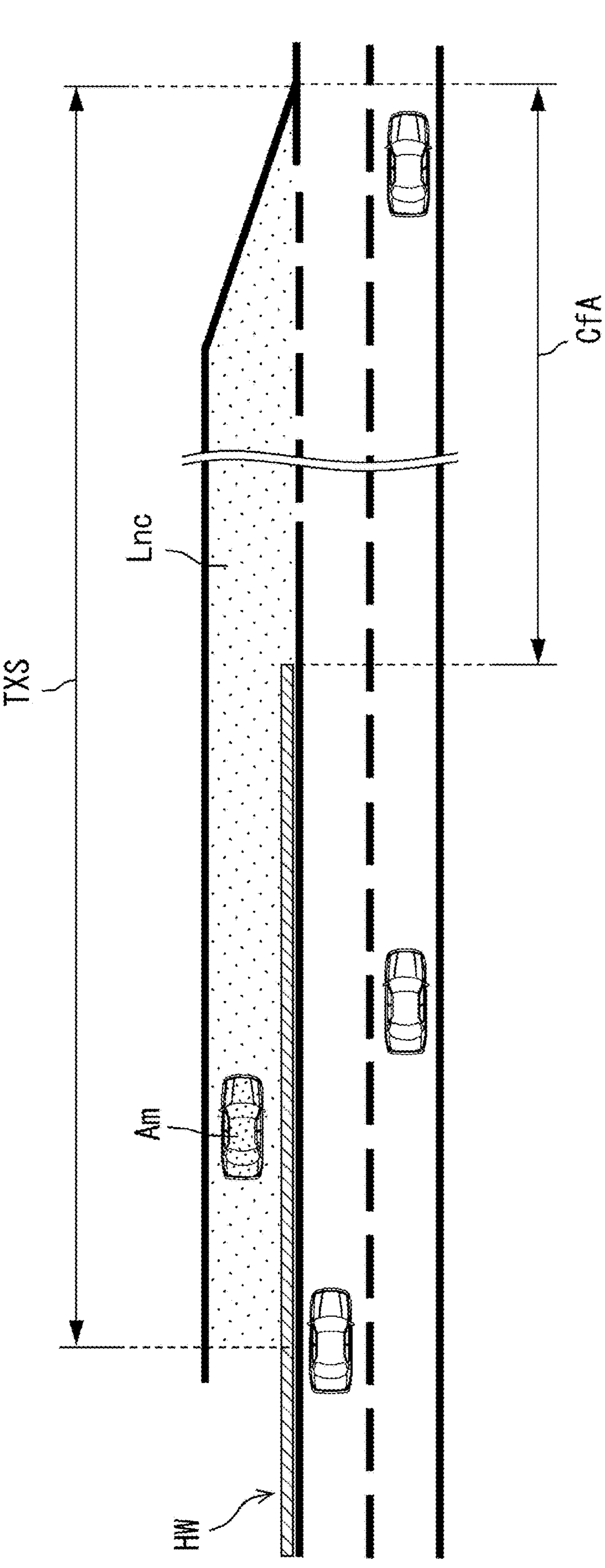
FIG. 10 is a diagram illustrating an example of a scene of merging into a main vehicular lane at a merging area.

When the merging lane Lnc narrows in the merging area CfA as illustrated in FIG. 10, the action determination unit 63 sets the restriction section TXS, in which implementation of the autonomous travel control is restricted, to the merging lane Lnc. The restriction section TXS is set in a range including the merging area CfA. The start point of the restriction section TXS is set to, for example, a point that is at a near side of the start point of the merging area CfA by about 500 m to 600 m, or a point that is about 20 seconds from reaching the start point of the merging area CfA. The end point of the restriction section TXS is an end of the merging lane Lnc.

When the action determination unit 63 determines to interrupt the autonomous travel control, the control switching unit 77 performs a control transition of lowering the autonomous driving level after the subject vehicle Am enters the restriction section TXS. Specifically, the control switching unit 77 performs switching from the autonomous travel control to the hands-off driving support control. When the control transition to the hands-off driving support control is to be performed, the information coordination unit 61 coordinates with the HCU 100 and, before the control transition, requests the driver to restart the surroundings monitoring.

Figure 11:
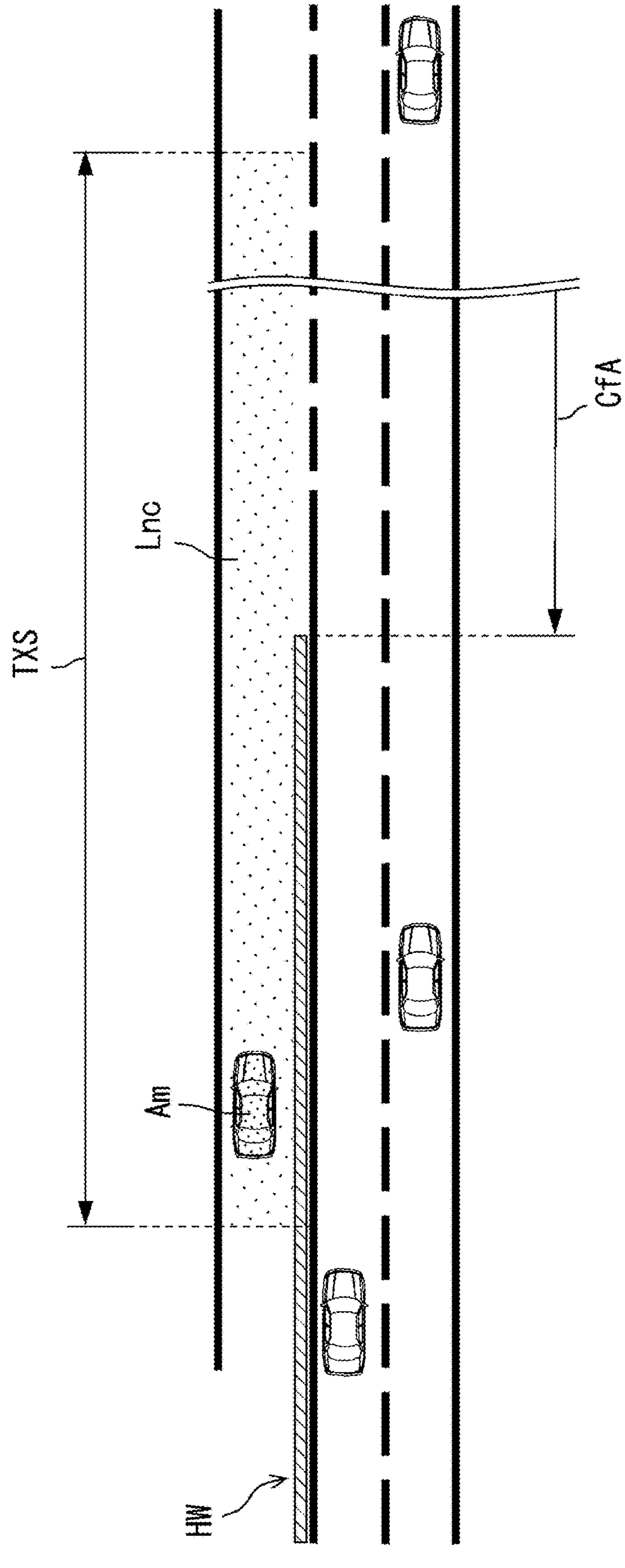
FIG. 11 is a diagram illustrating another example of the scene of merging into a main vehicular lane at a merging area.

When the merging lane Lnc does not narrow in the merging area CfA as illustrated in FIG. 11, the action determination unit 63 determines to continue the autonomous travel control. In this case, the action determination unit 63 performs setting change of narrowing an allowable range of the second task as the subject vehicle Am approaches the merging area CfA. When the autonomous travel control is continued, the restriction on the second task may be loosened. As an example, when video contents are being reproduced, processing of canceling only the screen display and continuing the reproduction of sounds is performed.

The action determination section 63 sets the restriction section TXS, in which the implementation of the second task is restricted, to a range including the merging area CfA. The information coordination unit 61 coordinates with the HCU 100 and starts the restriction on the second task after the subject vehicle Am enters the restriction section TXS. The information coordination unit 61 automatically lifts the restriction on the second task after the subject vehicle Am exits the restriction section TXS.

The start point of the restriction section TXS is set to, for example, a point that is at a near side of the start point of the merging area CfA by about 300 m to 400 m, or a point that is about 15 seconds from reaching the start point of the merging area CfA. When the merging lane Lnc does not narrow, the start point of the restriction section TXS is set to a position (at a back side) closer to the start point of the merging area CfA than when the merging lane Lnc narrows (see FIG. 10). The end point of the restriction section TXS is set to the back side of the end point of the merging area CfA.

Here, when the main vehicular lane (lane after merging) of the highway HW is the prohibition area (MD area) of the autonomous travel control, the action determination unit 63 interrupts the autonomous travel control before reaching the start point of the merging area CfA, and performs the control transition of lowering the autonomous driving level. The action determination unit 63 performs the driving takeover to the driver before the merging area CfA regardless of whether the number of lanes decreases in the merging area CfA.

In addition, the action determination unit 63 ends the autonomous travel control earlier when approaching the merging area CfA determined as the prohibition area than when approaching a normal prohibition area set in a road section different from the merging area CfA. As an example, when the driving takeover is normally set to be performed 500 m before the prohibition area, the driving takeover is started 600 m before the merging area CfA in a scene in which the merging area CfA is the prohibition area.

After the subject vehicle Am enters the merging area CfA as illustrated in FIG. 12, the action determination unit 63 grasps a jam degree of the main vehicular lane, which is a merging destination, based on the detection information of the surroundings monitoring sensor 30 recognized by the environment recognition unit 62. When the main vehicular lane is congested or when the main vehicular lane is jammed to such an extent that the lane change becomes difficult, the action determination unit 63 performs a control transition of lowering the autonomous driving level than when the main vehicular lane is not congested or when the main vehicular lane is not jammed. As an example, the control switching unit 77 performs switching from the hands-off driving support control to the hands-on driving support control based on grasping of the traffic congestion in the main vehicular lane. When the jam of the main vehicular lane can be grasped early based on the received information of the in-vehicle communication device 39, the control switching unit 77 may perform the control transition of lowering the autonomous driving level before the subject vehicle Am enters the merging area CfA.

The information coordination unit 61 coordinates with the HCU 100 to request the driver to restart the gripping of the steering wheel, accompanying the transition to the hands-on driving support control. At this time, the HCU 100 performs notification, which indicates that the main vehicular lane is in traffic congestion or jammed, by using the status image on the meter display 21.

In the case of the road shape in which the merging lane Lnc narrows in the merging area CfA, the action determination unit 63 sets a stop start position Ps to a specific position that is at a near side of the end of the merging lane Lnc. A distance from the end of the merging lane Lnc to the stop start position Ps may be adjusted to be longer as the traveling speed of the subject vehicle Am is higher (larger).

When the main vehicular lane is jammed and automatic lane change to the main vehicular lane by the LCA is difficult, the information coordination unit 61 coordinates with the HCU 100 and makes the driving takeover request to the driver in a section from the entry to the merging area CfA to the arrival at the stop start position Ps. With the driving takeover request, execution of the lane change by manual driving is prompted. When the subject vehicle Am reaches the stop start position Ps without the driving takeover to the driver and the automatic lane change to the main vehicular lane being performed, the action determination unit 63 starts stop control of automatically stopping the subject vehicle Am. The action determination unit 63 coordinates with the control execution unit 64 and the travel control ECU 40 and stops the subject vehicle Am at the near side of the position where the merging lane Lnc disappears. After stop of the subject vehicle Am, the control switching unit 77 transitions the driving control state of the subject vehicle Am to a manual driving state. After the automatic stop of the subject vehicle Am, the information coordination unit 61 coordinates with the HCU 100 to perform notification for prompting the surroundings monitoring. The driver can restart the traveling of the subject vehicle Am by a normal driving operation.

When the merging lane Lnc is congested at the near side of the merging area CfA as illustrated in FIG. 13, the action determination unit 63 causes the subject vehicle Am to merge in the merging area CfA while continuing the autonomous travel control regardless of whether the number of lanes decreases in the merging area CfA. The subject vehicle state grasping unit 73 may grasp the traffic congestion of the merging lane Lnc based on the detection information of the camera unit 31 or the like, or may grasp the traffic congestion of the merging lane Lnc based on the traffic congestion information received by the in-vehicle communication device 39. The control switching unit 77 switches the control mode from the area level 3 to the traffic congestion scene level 3, based on the grasping of the traffic congestion around the subject vehicle by the subject vehicle state grasping unit 73. Accordingly, the subject vehicle Am enters the merging area CfA while following a preceding vehicle.

Figure 14:
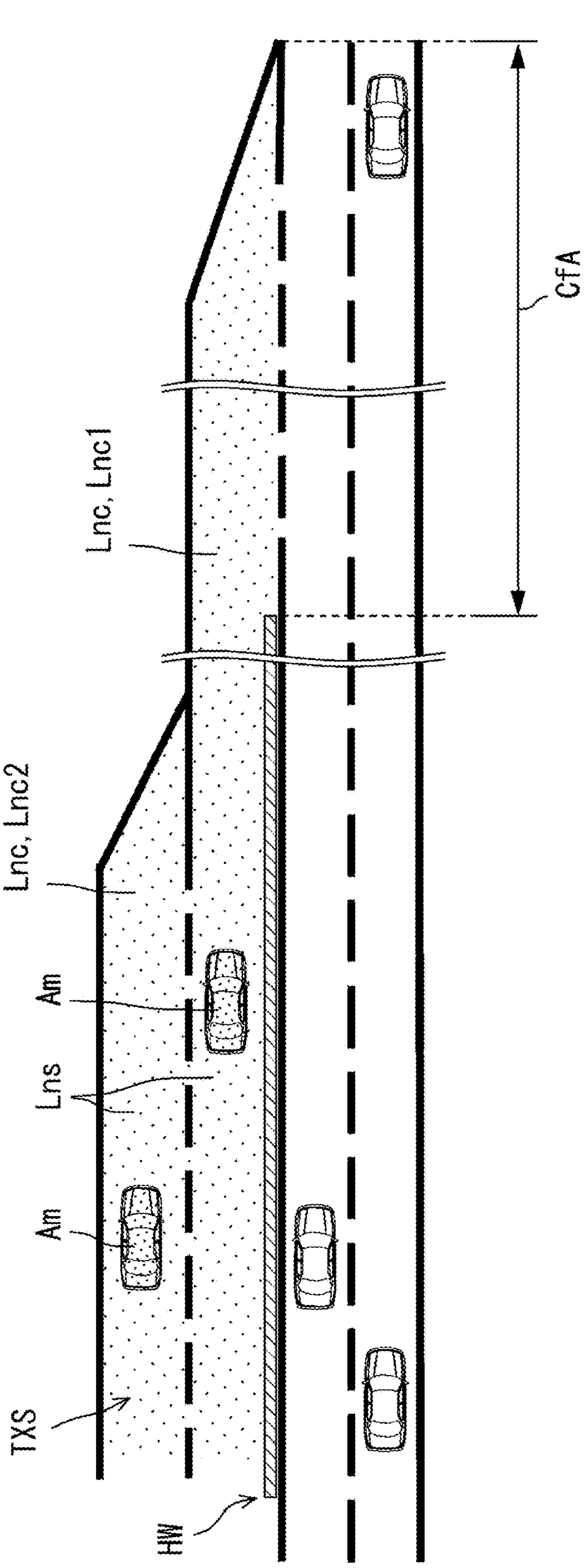
FIG. 14 is a diagram illustrating an example of a merging scene in a merging area in which there are multiple merging lanes.

When there are multiple merging lanes Lnc as illustrated in FIG. 14, the action determination unit 63 sets the restriction section TXS, in which the implementation of the autonomous travel control is restricted, for each merging lane Lnc. The start points of the restriction sections TXS may be the same in the adjacent merging lane Lnc1 and the separated merging lane Lnc2, or the start point in the separated merging lane Lnc2 may be set to a near side of the start point in the adjacent merging lane Lnc1.

After entering the restriction section TXS, the action determination unit 63 changes the driving control state of the subject vehicle Am according to the position of the subject vehicle lane Lns. The action determination unit 63 changes the driving control state to a state having a higher dependency on the driver when the separated merging lane Lnc2 is the subject vehicle lane Lns than when the adjacent merging lane Lnc1 is the subject vehicle lane Lns. Specifically, when the subject vehicle Am travels in the separated merging lane Lnc2, the control switching unit 77 performs control change from the autonomous travel control to the hands-on driving support control after entering the restriction section TXS. On the other hand, when the subject vehicle Am travels in the adjacent merging lane Lnc1, the control switching unit 77 performs control change from the autonomous travel control to the hands-off driving support control after entering the restriction section TXS.

Even when multiple merging lanes Lnc merge with the main vehicular lane in the merging area CfA and the merging area CfA has a road shape in which the number of lanes does not decrease, the action determination unit 63 can change the driving control state of the subject vehicle Am depending on whether the subject vehicle lane Lns is the adjacent merging lane Lnc1. As an example, when the subject vehicle Am travels in the adjacent merging lane Lnc1, the action determination unit 63 continues the traveling performed according to the autonomous travel control while narrowing the allowable range of the second task. On the other hand, when the subject vehicle Am travels in the separated merging lane Lnc2, the action determination unit 63 continues the traveling performed according to the autonomous travel control without changing the allowable range of the second task.

Next, details of continuation determination processing, pre-merging transition processing, the main-lane merging processing, and post-merging transition processing for implementing the control in the merging area CfA and the branching area BrA described above will be described below based on FIGS. 15 to 20 with reference to FIGS. 1 to 14.

Figure 15:
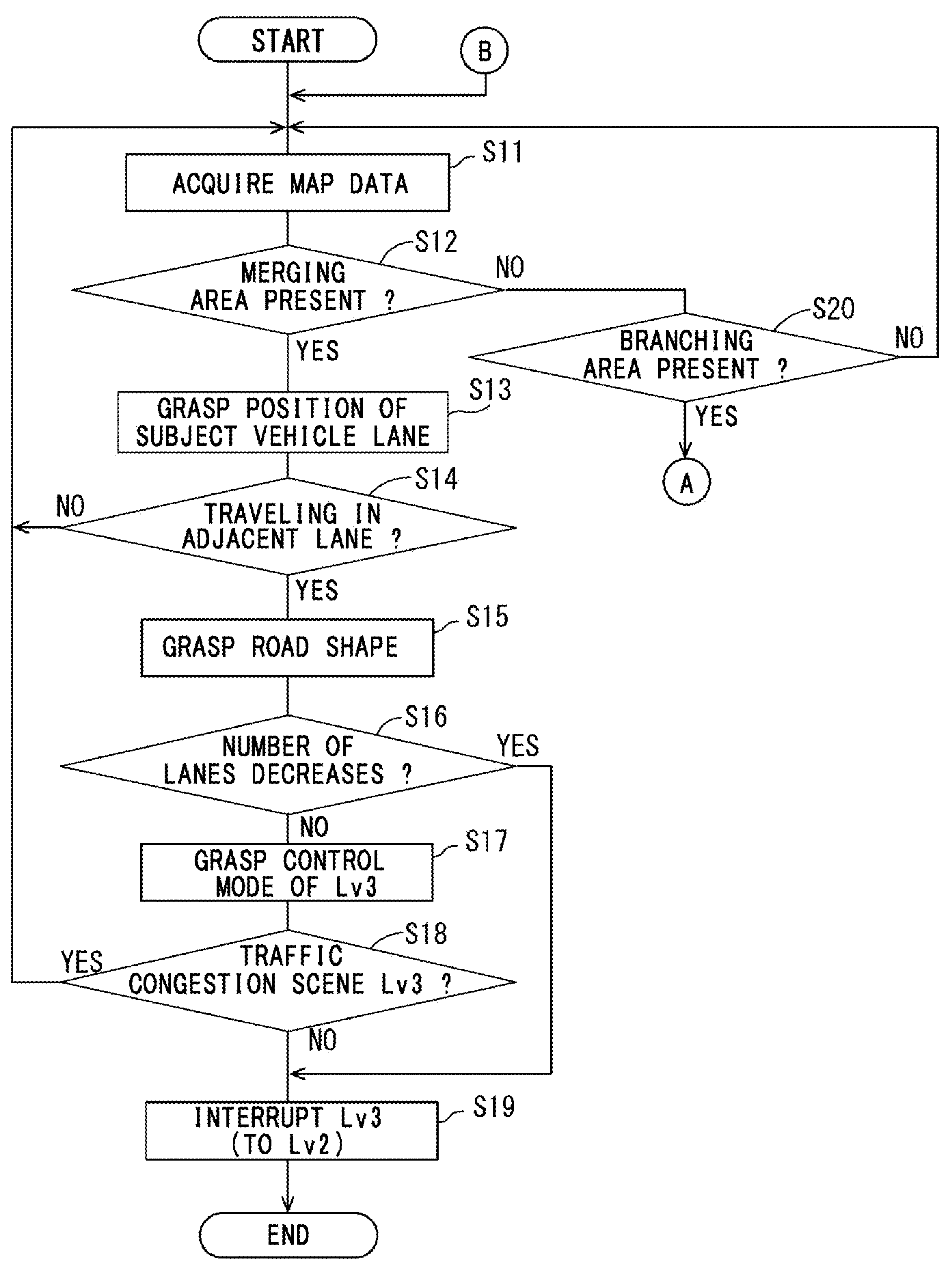
FIG. 15 is a flowchart showing details of continuation determination processing performed by the autonomous driving ECU together with FIG. 16.
Figure 16:
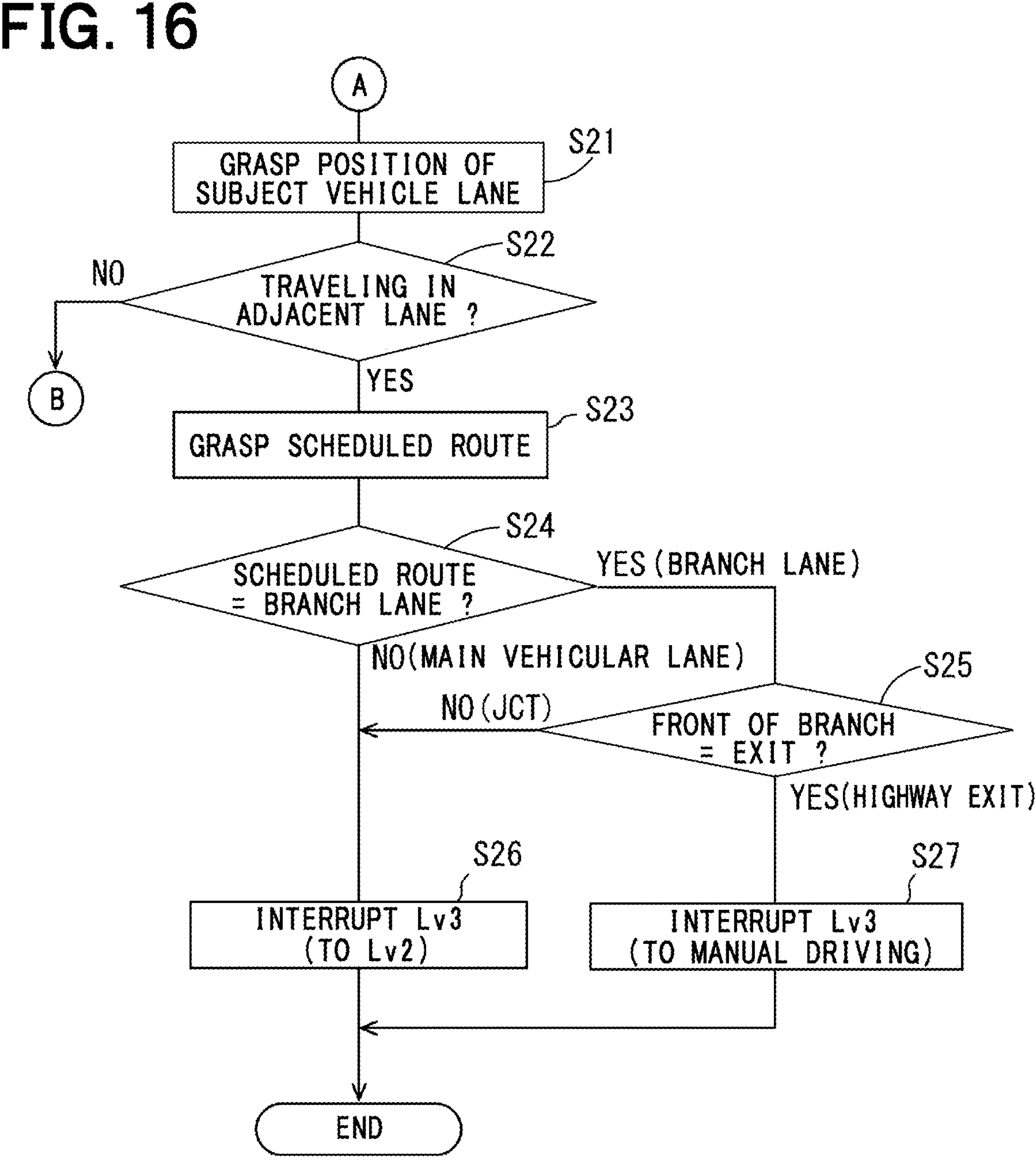
FIG. 16 is a flowchart showing details of the continuation determination processing together with FIG. 15.

The continuation determination processing illustrated in FIGS. 15 and 16 is started based on activation of the autonomous travel control, and is continuously performed by the autonomous driving ECU 50*b* until the autonomous travel control ends. In S11 of the continuation determination processing, the road information grasping unit 72 acquires map data in the traveling direction of the subject vehicle Am. In S12, based on the map data acquired in S11, it is determined whether the merging area CfA is present in a specific range (for example, a range of about 1 to several kilometers) in the traveling direction of the subject vehicle Am traveling in the main vehicular lane. When the presence of the merging area CfA is grasped in S12, the process proceeds to S13.

In S13, the subject vehicle state grasping unit 73 grasps a position of the subject vehicle lane Lns. In S14, it is determined whether the subject vehicle lane Lns grasped in S13 is the adjacent lane Lno adjacent to the merging lane Lnc. When it is determined in S14 that the subject vehicle lane Lns is the non-adjacent lane Lnx, the process returns to S11. In this case, the autonomous travel control in which the driver has no surroundings monitoring obligation is continued. On the other hand, when it is determined in S14 that the subject vehicle lane Lns is the adjacent lane Lno, the process proceeds to S15. When a road on which the subject vehicle Am is traveling is a road with one lane in each direction, the process also proceeds from S14 to S15.

In S15, the road information grasping unit 72 grasps a road shape of the merging area CfA present in the traveling direction based on the map data acquired in S11. In S16, it is determined whether the road shape of the merging area CfA grasped in S15 is a road shape in which the number of lanes decreases. When it is determined in S16 that the merging area CfA has a road shape in which the number of lanes decreases, the process proceeds to S19, continuation of the autonomous travel control is restricted, and the current continuation determination processing ends. Specifically, in S19, the action determination unit 63 determines to interrupt the autonomous travel control and to transition from the autonomous travel control to the driving support control.

On the other hand, when it is determined in S16 that the merging area CfA has a road shape in which the number of lanes does not decrease, the process proceeds to S17. In S17, the action determination unit 63 grasps a control mode being executed. In S18, it is determined, based on grasped information in S17, whether the control mode being executed is the traffic congestion scene level 3. When it is determined in S18 that the traffic congestion scene level 3 is being executed, the process returns to S11. As described, when the merging area CfA has a road shape in which the number of lanes does not decrease and the control mode of the autonomous travel control is the traffic congestion scene level 3, the continuation of the autonomous travel control is permitted.

On the other hand, when it is determined in S18 that the area level 3 is being executed, the process proceeds to S19, and the interruption of the autonomous travel control and the transition from the autonomous travel control to the driving support control are determined. As described, even in the case where the merging area CfA has a road shape in which the number of lanes does not decrease, the continuation of the autonomous travel control is restricted when the control mode of the autonomous travel control is the area level 3.

When presence of the merging area CfA is not grasped in S12, the process proceeds to S20. In S20, based on the map data acquired in S11, it is determined whether the branching area BrA is present within a specific range in the traveling direction. When the branching area BrA is not grasped in S20, the process returns to S11. In this case, the autonomous travel control in which the driver has no surroundings monitoring obligation is continued. On the other hand, when the branching area BrA is grasped in S20, the process proceeds to S21.

In S21, similarly to S13, the position of the subject vehicle lane Lns is grasped. In S22, it is determined whether the subject vehicle lane Lns grasped in S21 is the adjacent lane Lno adjacent to the branch lane Lnb. When it is determined in S22 that the subject vehicle lane Lns is the non-adjacent lane Lnx, the process returns to S11. In this case, the autonomous travel control in which the driver has no surroundings monitoring obligation is continued. On the other hand, when it is determined in S22 that the subject vehicle lane Lns is the adjacent lane Lno, the process proceeds to S23. When the road on which the subject vehicle Am is traveling is a road with one lane in each direction, the process also proceeds from S22 to S23.

In S23, the subject vehicle state grasping unit 73 grasps a scheduled route of the subject vehicle Am. In S24, it is determined whether the scheduled route grasped in S23 is set to the branch lane Lnb. When it is determined in S24 that the scheduled route is set to the main vehicular lane, the process proceeds to S26. In S26, the action determination unit 63 determines the interruption of the autonomous travel control and the transition from the autonomous travel control to the driving support control. On the other hand, when it is determined in S24 that the scheduled route is set to the branch lane Lnb, the process proceeds to S25.

In S25, the road information grasping unit 72 grasps whether the end of the branch lane Lnb is an exit from the highway HW. When the end of the branch lane Lnb is not an exit from the highway HW and the branch lane Lnb is a junction or the like, the process proceeds from S25 to S26, and the action determination unit 63 determines to switch from the autonomous travel control to the driving support control. On the other hand, when the end of the branch lane Lnb is an exit of the highway HW, the process proceeds from S25 to S27, and the action determination unit 63 determines to switch from the autonomous travel control to the manual driving.

Figure 17:
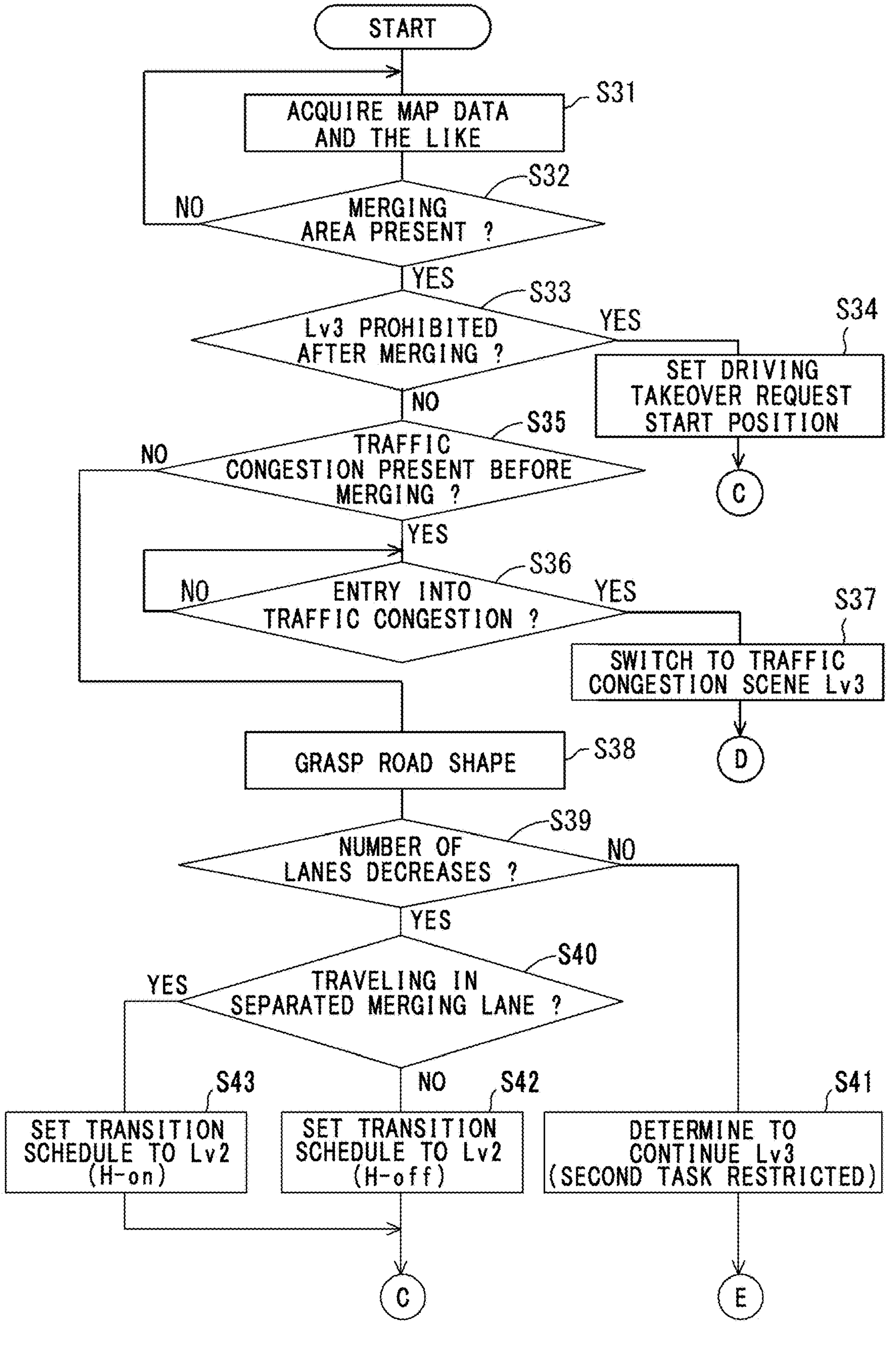
FIG. 17 is a flowchart showing details of pre-merging transition processing performed by the autonomous driving ECU together with FIG. 18.
Figure 18:
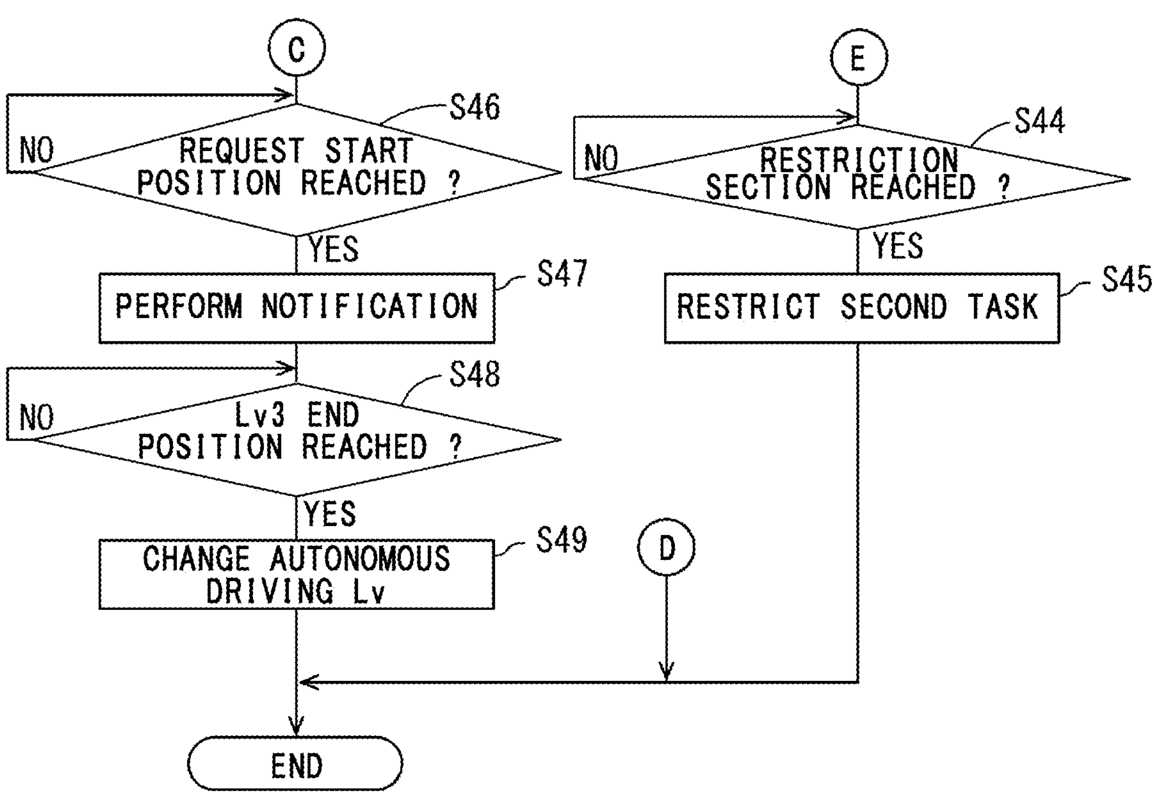
FIG. 18 is a flowchart showing details of the pre-merging transition processing together with FIG. 17.

The pre-merging transition processing illustrated in FIGS. 17 and 18 is started by the autonomous driving ECU 50*b* when traveling in the merging lane Lnc according to the autonomous travel control is started. In S31 of the pre-merging transition processing, the road information grasping unit 72 acquires map data in the traveling direction of the subject vehicle Am, the received information by the in-vehicle communication device 39, and the like. In S32, based on the map data or the like acquired in S31, it is determined whether the merging area CfA is present in a specific range (for example, a range of about 1 km) in the traveling direction of the subject vehicle Am traveling in the merging lane Lnc. When presence of the merging area CfA is grasped in S32, the process proceeds to S33.

In S33, based on the map data and the received information, the road information grasping unit 72 determines whether a main vehicular lane as a merging destination is a prohibition area. When it is determined in S33 that the main vehicular lane is a prohibition area, a request start position for performing the driving takeover early is set to a near side of the merging area CfA in S34, and the process proceeds to S46. On the other hand, when it is determined in S33 that the main vehicular lane is not a prohibition area but the AD area, the process proceeds to S35.

In S35, the subject vehicle state grasping unit 73 determines whether traffic congestion has occurred in the merging lane Lnc before merging. When it is determined in S35 that the merging lane Lnc is congested, it is further determined in S36 whether the subject vehicle has entered a congested section, based on, for example, vehicle speed information. When it is determined in S36 that the subject vehicle Am has entered a congested section, the control switching unit 77 switches the control mode from the area level 3 to the traffic congestion scene level 3 in S37.

When it is determined in S35 that the merging lane Lnc is not congested, the road information grasping unit 72 grasps a road shape of the merging area CfA in S38. In S39, it is determined whether the road shape grasped in S38 is a road shape in which the number of lanes decreases. When it is determined in S39 that the road shape is a road shape in which the number of lanes does not decrease, in S41, it is determined to continue the autonomous travel control (autonomous driving of Level 3). In S41, restriction contents of the second task and the restriction section TXS are set. When it is determined in S44 that the subject vehicle Am has reached the restriction section TXS, restriction to narrow an allowable range of the second task is started in S45.

When it is determined in S39 that the road shape is a road shape in which the number of lanes decreases, in S40, the subject vehicle state grasping unit 73 determines whether the subject vehicle is traveling in the separated merging lane Lnc2. In S40, the subject vehicle state grasping unit 73 first determines whether the road shape is a road shape in which multiple merging lanes Lnc merge with the main vehicular lane. When it is determined that there are multiple merging lanes Lnc, the subject vehicle state grasping unit 73 further determines whether the subject vehicle lane Lns is the adjacent merging lane Lnc1.

In S40, when it is determined that the number of merging lanes Lnc is one or when it is determined that the subject vehicle Am is traveling in the adjacent merging lane Lnc1, in S42, the action determination unit 63 determines control transition to the hands-off driving support control. In S42, a transition schedule to the hands-off driving support control, specifically, a request start position for starting a restart request of surroundings monitoring, and a start position and an end position of the restriction section TXS are set. On the other hand, when it is determined in S40 that there are multiple merging lanes Lnc and the subject vehicle Am is traveling in the separated merging lane Lnc2, the action determination unit 63 determines control transition to the hands-on driving support control in S43. In S43, a transition schedule to the hands-on driving support control, specifically, a request start position for starting a restart request of gripping of the steering wheel and surroundings monitoring, and a start position and an end position of the restriction section TXS are set.

In S46, it is determined whether the subject vehicle Am has reached the request start position for driving takeover set in S34, S42, or S43. When it is determined in S46 that the subject vehicle Am has reached the request start position, notification for requesting a driving takeover or the like in coordination with the information coordination unit 61 and the HCU 100 is started in S47.

In S48, it is determined whether the subject vehicle Am has reached an end position of the autonomous travel control, that is, the start position of the restriction section TXS. When it is determined in S48 that the subject vehicle Am has reached the start position of the restriction section TXS, change to a predetermined driving control state (autonomous driving level) is performed in S49.

Figure 19:
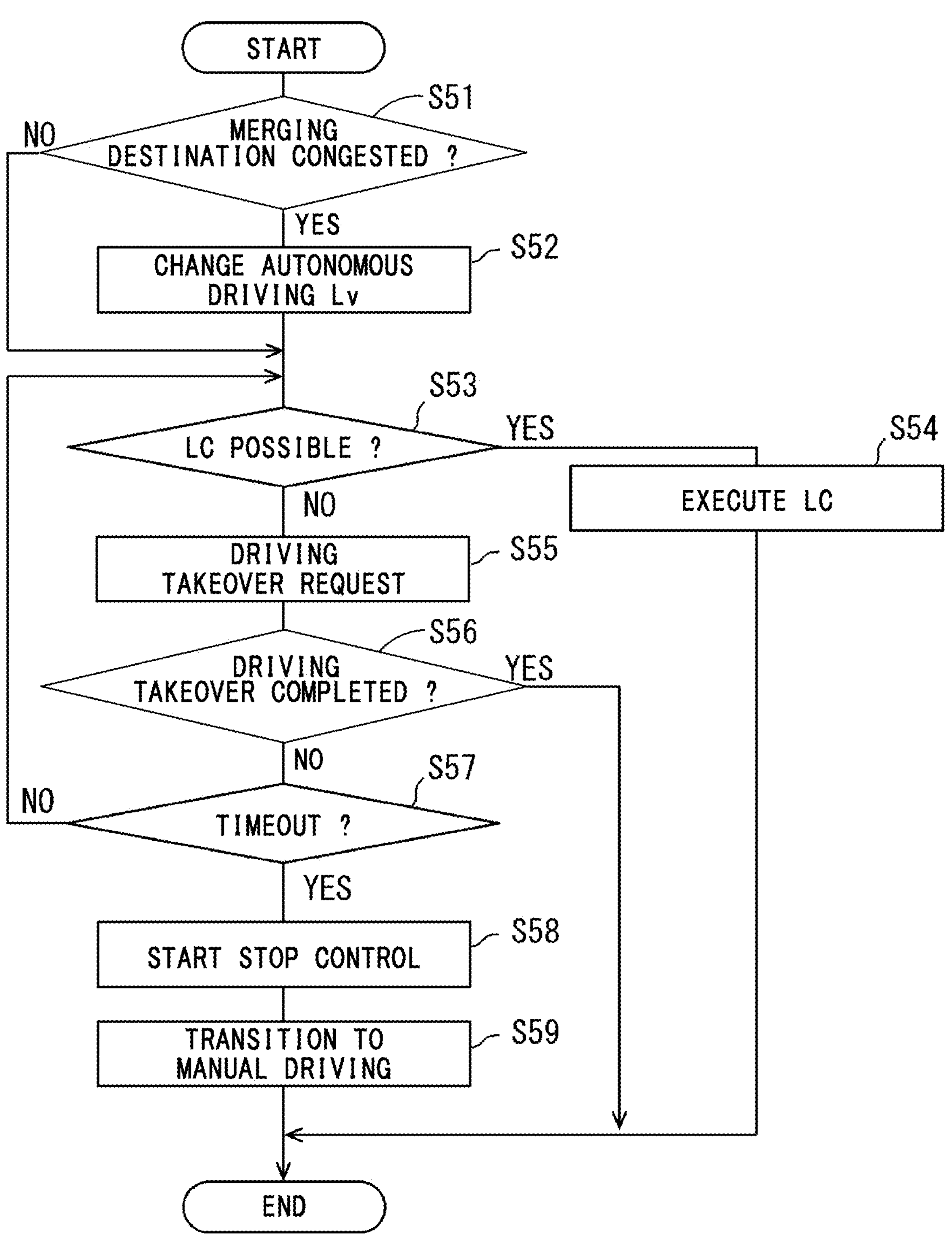
FIG. 19 is a flowchart showing details of main-lane merging processing.

The main-lane merging processing illustrated in FIG. 19 is started by the autonomous driving ECU 50*b* based on completion of the pre-merging transition processing of performing the transition to the driving support control in the case of the road shape in which the merging lane Lnc narrows in the merging area CfA. The autonomous driving ECU 50*b* may perform the main-lane merging processing in coordination with the driving support ECU 50*a*.

In S51 of the main-lane merging processing, the subject vehicle state grasping unit 73 determines whether the main vehicular lane that is the merging destination is congested. When it is determined in S51 that the main vehicular lane is congested, the control switching unit 77 performs change of lowering the autonomous driving level. As an example, in S52, change from the hands-off driving support control to the hands-on driving support control is performed.

In S53, it is determined whether automatic lane change according to the driving support control (LCA) is possible. When it is determined in S53 that the automatic lane change is possible, lane change to the main vehicular lane is executed in S54. On the other hand, when the automatic lane change cannot be started due to traffic congestion or jam in the main vehicular lane, a shift request to manual driving is started in S55. When the driver starts the driving operation in response to the driving takeover request started in S55, the main-lane merging processing is ended. In this case, the lane change to the main vehicular lane is left to the driver.

In S57, it is determined whether the lane change has timed out. When the automatic lane change cannot be started and the subject vehicle Am reaches the stop start position Ps (see FIG. 12) without the driving takeover being performed, the action determination unit 63 determines that the lane change has timed out. In this case, the action determination unit 63 starts stop control of automatically stopping the subject vehicle Am in S58. Further, in S59, the control switching unit 77 transitions the driving control state to the manual driving state after the subject vehicle Am stops. As described above, at the near side of the end of the merging lane Lnc, the subject vehicle Am enters a state of waiting for starting according to restart of the driving operation of the driver.

Figure 20:
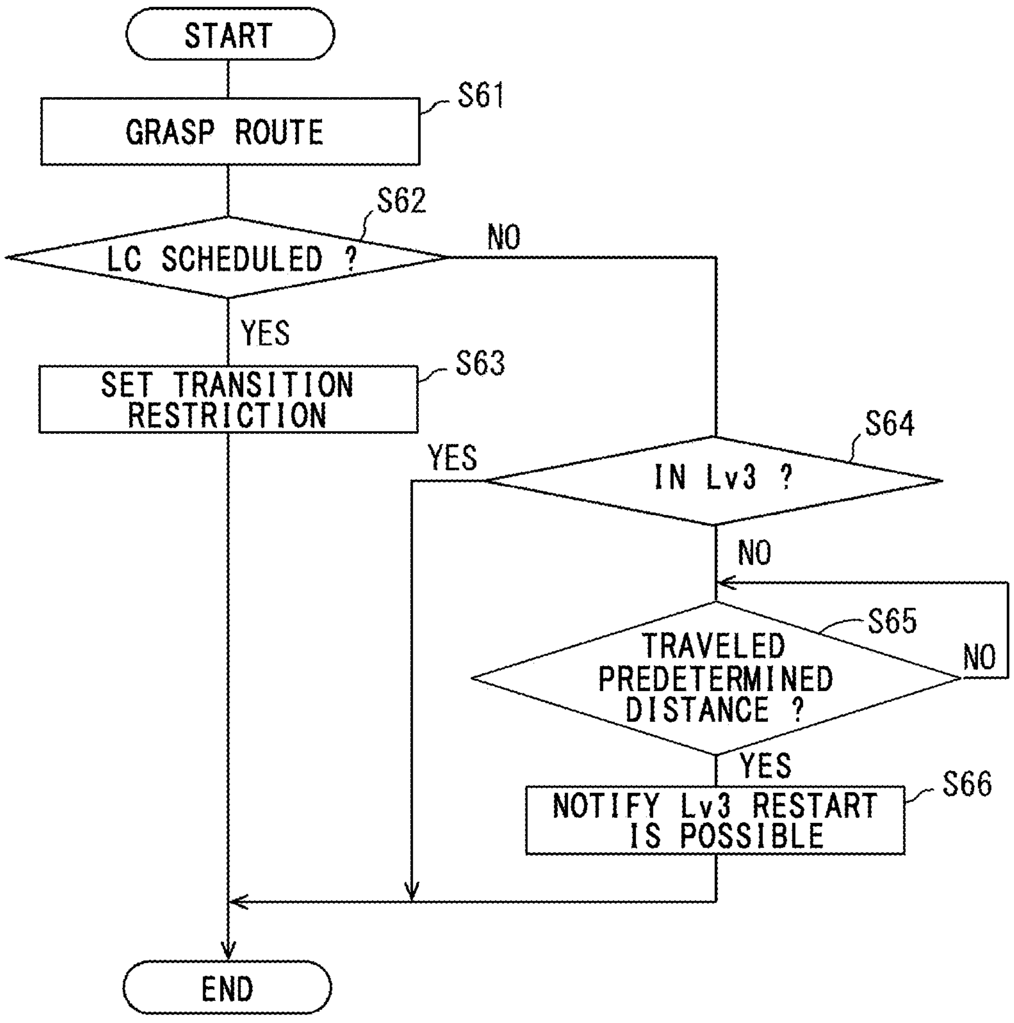
FIG. 20 is a flowchart illustrating details of post-merging transition processing.

The post-merging transition processing illustrated in FIG. 20 is started by the autonomous driving ECU 50*b* after completion of merging in the merging area CfA. In S61 of the post-merging transition processing, the action determination unit 63 grasps a future route of the subject vehicle Am based on the route information. In S62, the action determination unit 63 refers to the grasped future route and determines whether lane change occurs within a predetermined distance or a predetermined time after the merging. When it is determined in S62 that lane change is scheduled, in S63, the action determination unit 63 restricts (prohibits) the control transition of raising the autonomous driving level until the scheduled lane change is completed. Specifically, neither a transition from the hands-on driving support control to the hands-off driving support control nor a transition from the hands-off driving support control to the autonomous travel control is performed. In S63, the transition from the hands-off driving support control to the autonomous travel control may be restricted while the transition from the hands-on driving support control to the hands-off driving support control may be permitted.

When it is determined in S62 that no lane change is scheduled, it is determined in S64 whether the autonomous travel control (autonomous driving of level 3) is being executed. When it is determined in S64 that the autonomous travel control is being executed, the post-merging transition processing is ended. On the other hand, when it is determined in S64 that the autonomous travel control is not being executed, the action determination unit 63 determines in S65 whether a travel distance after the merging exceeds the predetermined distance. In S65, the action determination unit 63 may determine whether an elapsed time after the merging exceeds the predetermined time. When it is determined in S65 that the travel distance after the merging exceeds the predetermined distance, in S66, the information coordination unit 61 coordinates with the HCU 100 and notifies the driver that restart of the autonomous travel control is possible. As an example, the HCU 100 causes the driver to notice that the autonomous travel control can be restarted, by notification of turning on or blinking the ambient light 25 provided on the steering wheel in a specific emission color (for example, blue).

In the present embodiment described above, a road shape of the merging area CfA present in the traveling direction is grasped, and whether to continue the autonomous travel control in the merging area CfA is determined according to the road shape of the merging area CfA. According to the above, even in the merging area CfA, the autonomous travel control can be continued depending on the road shape, and thus it is possible to secure a long period in which the surroundings monitoring of the driver is unnecessary. Accordingly, the convenience of autonomous driving can be secured.

In addition, in the present embodiment, in the case where the merging area CfA has a road shape in which the number of lanes decreases, a cut-in risk of the merging vehicle Ac increases, and thus the continuation of the autonomous travel control is restricted. On the other hand, in the case where the merging area CfA has a road shape in which the number of lanes does not decrease, the cut-in risk of the merging vehicle Ac decreases, and thus the continuation of the autonomous travel control is permitted. As described above, when the continuation of the autonomous travel control is permitted in consideration of the cut-in risk in the merging area CfA, certainty that the subject vehicle can pass through the merging area CfA by traveling with the autonomous travel control increases. As a result, the convenience of autonomous driving can be improved.

In the present embodiment, when the autonomous travel control is continued in the merging area CfA having a road shape in which the number of lanes does not decrease, the merging vehicle notification indicating presence of the merging vehicle Ac is performed based on the occurrence of the merging vehicle Ac that attempts to merge into the subject vehicle lane Lns. Therefore, the driver can grasp the presence of the merging vehicle Ac, which is a risk object around the subject vehicle, through the merging vehicle notification even when the surroundings monitoring is not performed. As described, by performing the presentation that assists the driver in grasping the information, the convenience of the autonomous driving can be further improved.

Further, in the present embodiment, even in the case where the merging area CfA has a road shape in which the number of lanes does not decrease, the continuation of the autonomous travel control is restricted when the control mode of the autonomous travel control is the area level 3. As described, when the area level 3 is implemented, traveling speeds of the subject vehicle Am and other vehicles around the subject vehicle are likely to increase. Therefore, by restricting the continuation of the autonomous travel control, it is possible to avoid occurrence of a situation in which the autonomous travel control is suddenly interrupted.

On the other hand, when the merging area CfA has a road shape in which the number of lanes does not decrease and the control mode of the autonomous travel control is the traffic congestion scene level 3, the continuation of the traffic congestion scene level 3 is permitted. As described, when the traffic congestion scene level 3 is implemented, the traveling speeds of the subject vehicle Am and other vehicles around the subject vehicle are unlikely to increase. Therefore, a situation in which the autonomous travel control is suddenly interrupted even when the continuation of the autonomous travel control is permitted is unlikely to occur. As described above, by permitting the continuation in the merging area CfA only at the traffic congestion scene level 3, the convenience of the autonomous driving can be further improved.

In addition, in the present embodiment, when the subject vehicle Am travels in the merging lane Lnc according to the autonomous travel control, the road shape of the merging area CfA merging into the main vehicular lane is grasped, and the driving control state of the subject vehicle Am is changed according to the road shape of the merging area CfA. According to the above, even in the merging area CfA, the driving control state with a low dependence on the driver such as the autonomous travel control can be continued according to the road shape. As a result, the convenience of the autonomous driving can be secured.

In the present embodiment, the driving control state is changed to a state having a higher dependency on the driver when the merging area CfA has a road shape in which the merging lane Lnc narrows than when the merging area CfA has a road shape in which the merging lane Lnc does not narrow. Specifically, when the merging lane Lnc disappears, the control change of lowering the autonomous driving level is performed. According to the above, in a merging scene in which the lane change is not necessary in the merging area CfA, the convenience for the driver can be secured by continuing the autonomous travel control. On the other hand, in a merging scene in which the lane change is necessary, it is possible to reliably merge into the main vehicular lane by a partial transfer of the control right to the driver.

Further, in the present embodiment, when the restart of the autonomous travel control becomes possible after the autonomous travel control is interrupted in the merging area CfA, the information coordination unit 61 coordinates with the HCU 100 and notifies the driver that the restart of the autonomous travel control is possible. Therefore, the driver can restart use of the autonomous travel control early. As a result, since it is possible to secure a long period in which the surroundings monitoring is unnecessary, the convenience of the autonomous driving can be further improved.

In addition, in the present embodiment, when the road shape is a road shape in which the merging lane Lnc narrows in the merging area CfA and the lane change to the main vehicular lane is not performed, the stop control of stopping the subject vehicle Am is started at the near side of the position where the merging lane Lnc disappears. Therefore, even in a case where the lane change to the main vehicular lane cannot be performed, a driving takeover from the system to the driver can be performed in a stable state.

In the present embodiment, the driving control state is changed to a state having a higher dependency on the driver when the main vehicular lane is congested than when the main vehicular lane is not congested. That is, when the traffic congestion in the main vehicular lane is grasped, the control change of lowering the autonomous driving level is performed. Therefore, even in a scene where the lane change is difficult for the system, it is possible to reliably perform the lane change to the main vehicular lane based on determination of the driver.

Further, in the present embodiment, when the merging lane Lnc is congested at the near side of the merging area CfA, merging of the subject vehicle Am is performed in the merging area CfA while the autonomous travel control is continued. As described above, when the merging lane Lnc is congested, the traveling speed of the subject vehicle Am is low, and thus merging according to the traffic congestion scene level 3 is possible. As a result, it is possible to secure a long period in which the surroundings monitoring is unnecessary, and thus it is possible to further improve the convenience of the autonomous driving.

In addition, in the present embodiment, in the case of a road shape in which multiple merging lanes Lnc merge with the main vehicular lane, the subject vehicle state grasping unit 73 grasps the position of the subject vehicle lane Lns in which the subject vehicle Am travels among the multiple merging lanes Lnc. The driving control state of the subject vehicle Am is changed in a case where the adjacent merging lane Lnc1 adjacent to the main vehicular lane is the subject vehicle lane Lns and a case where the separated merging lane Lnc2 separated from the main vehicular lane is the subject vehicle lane Lns. According to the above, even in the merging area CfA where multiple merging lanes Lnc are present, a change degree of the autonomous driving level can be appropriately changed according to the traveling position of the subject vehicle Am. As a result, smooth merging is possible.

In the present embodiment, the driving control state is changed to a state having a higher dependency on the driver when the separated merging lane Lnc2 is the subject vehicle lane Lns than when the adjacent merging lane Lnc1 is the subject vehicle lane Lns. According to such control, even in a merging scene where multiple times of lane change are required, smooth merging is possible by appropriately transferring the control right to the driver.

Further, in the present embodiment, the autonomous travel control is ended earlier when approaching the merging area CfA determined as a prohibition area than when approaching a prohibition area set in a road section different from the merging area CfA. Accordingly, the driver can take actions with sufficient time in the merging area CfA.

In addition, in the present embodiment, when the subject vehicle Am is scheduled to perform lane change after merging in the merging area CfA, execution of processing of changing the driving control state to a state having a low dependency on the driver is restricted. According to the above, when performing the next lane change, the driving control state is unlikely to be changed again. As a result, it is possible to avoid a complicated shift between the system and the driver, and thus the convenience of the autonomous driving is more easily secured.

In the present embodiment, when the autonomous travel control is continued in the merging area CfA, the allowable range of the second task is narrowed before reaching the merging area CfA. As described, if the continuation of the autonomous travel control is permitted after loosely restricting performing of the second task, the convenience of the autonomous driving is more easily secured.

Further, in the present embodiment, the autonomous travel control is interrupted when the branch lane Lnb and the subject vehicle lane Lns are adjacent to each other in the branching area BrA, whereas the continuation of the autonomous travel control is permitted when the branch lane Lnb and the subject vehicle lane Lns are not adjacent to each other. That is, the autonomous travel control can be continued even in the branching area BrA as long as the vehicle travels in a lane separated from the branch lane Lnb. According to the above, since it is possible to secure a long period in which surroundings monitoring of the driver is unnecessary, it is possible to secure the convenience of autonomous driving.

In addition, in the present embodiment, when the scheduled route of the subject vehicle Am traveling with the autonomous travel control is set to the branch lane Lnb, the contents of travel control after end of the autonomous travel control are changed according to whether the end of the branch lane Lnb is an exit from the highway HW. According to the above, it is possible to switch the operating state of the autonomous driving function according to whether the autonomous travel control can be performed at the end of the branch lane Lnb. As a result, the driver can smoothly transition to traveling at the end of the branch lane Lnb. Accordingly, the convenience of autonomous driving can be secured.

Specifically, when the end of the branch lane Lnb is not an exit of the highway HW, switching from the autonomous travel control to the driving support control in which the driver has a surroundings monitoring obligation is performed. As described, when the end of the branch lane Lnb is not an exit, there is a possibility that the autonomous travel control can be restarted after passing through the branch lane Lnb. Therefore, even after the autonomous travel control is ended, the traveling according to the driving support control is continued, and thus it is possible to smoothly restart the autonomous travel control at the end of the branch lane Lnb.

On the other hand, when the end of the branch lane Lnb is an exit of the highway HW, switching from the autonomous travel control to the manual driving of the driver is performed. As described, in a scene in which the end of the branch lane Lnb is an exit and the subject vehicle Am exits on a general road or the like, the possibility that the autonomous travel control can be restarted is low. Therefore, by transitioning to the manual driving after the autonomous travel control is ended, the driver can smoothly start traveling at the end of the branch lane Lnb. As described, if the transition from the autonomous travel control to the manual driving is performed early, the convenience of the autonomous driving can be further improved.

In the above-described embodiment, the highway HW corresponds to a "specific road", the information coordination unit 61 corresponds to a "notification control unit", and the action determination unit 63 corresponds to a "continuation determination unit". Further, the road information grasping unit 72 corresponds to a "road shape grasping unit", the subject vehicle state grasping unit 73 corresponds to a "subject vehicle position grasping unit", the control switching unit 77 corresponds to a "control change unit", and the autonomous driving ECU 50*b* corresponds to an "autonomous driving control device". The second task corresponds to a "specific act other than driving".

Other Embodiments

Although an embodiment of the present disclosure has been described above, the present disclosure is not construed as being limited to the above-described embodiment, and can be applied to various embodiments and combinations within a range not departing from the gist of the present disclosure.

Figure 21:
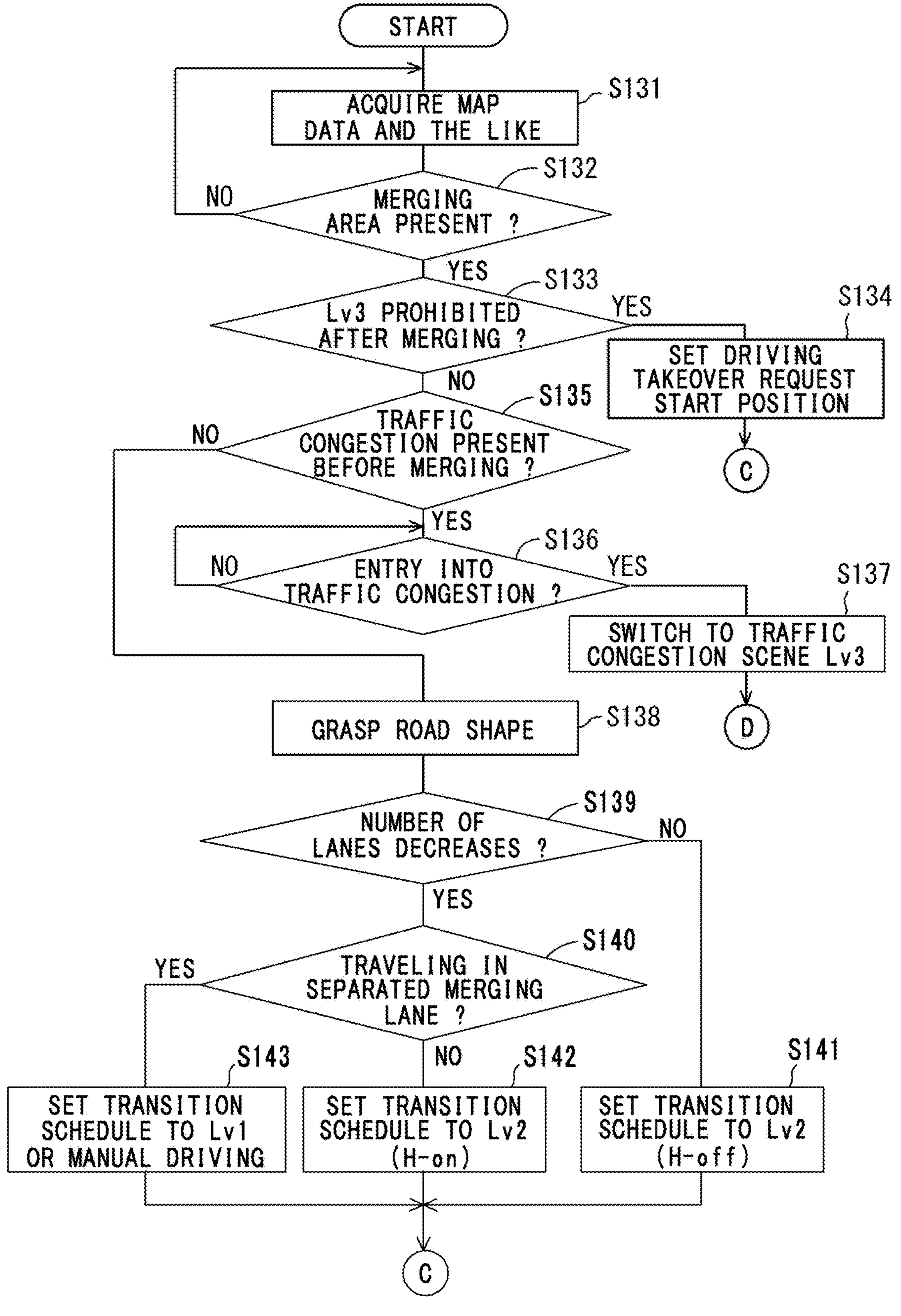
FIG. 21 is a flowchart showing details of pre-merging transition processing according to a first modification together with FIG. 18.

In a first modification of the above-described embodiment, details of pre-merging transition processing (see FIG. 21) are different from those of the pre-merging transition processing described above (see FIG. 17). In the first modification, when traveling in the merging lane Lnc, autonomous travel control is temporarily interrupted regardless of a road shape of the merging area CfA. Specifically, when the merging area CfA has a road shape in which the number of lanes does not decrease (S139: NO), the action determination unit 63 determines control transition to hands-off driving support control, and sets a transition schedule (S141).

On the other hand, when the merging area CfA has a road shape in which the number of lanes decreases (S139: YES), the subject vehicle state grasping unit 73 determines whether the subject vehicle is traveling in the separated merging lane Lnc2 (S140). When the subject vehicle Am is traveling in the single merging lane Lnc or the adjacent merging lane Lnc1 (S140: NO), the action determination unit 63 determines a control transition to the hands-on driving support control and sets the transition schedule (S142). On the other hand, when the subject vehicle Am is traveling in the separated merging lane Lnc2 (S140: YES), the action determination unit 63 determines driving support control (ACC) of autonomous driving level 1 or a transition to the manual driving and sets the transition schedule (S143).

Based on the transition schedules set in the respective processes, transition control of interrupting the autonomous travel control is performed (S46 to S49 in FIG. 18). At this time, notification of requesting the driver to perform a driving takeover (S47) is performed earlier when the merging area CfA has a road shape in which the merging lane Lnc narrows than when the merging area CfA has a road shape in which the merging lane Lnc does not narrow.

In the first modification described above, the same effects as those of the above-described embodiment can be obtained, and the driving control state having a low dependency on the driver can be continued according to the road shape of the merging area CfA. As a result, convenience of autonomous driving can be secured. In addition, in the first modification, when the merging lane Lnc narrows (see FIG. 10), a request for a driving takeover is started early. Therefore, the driver can acquire a control right of a driving operation early and prepare for lane change to a main vehicular lane.

In the first modification, when the autonomous travel control is interrupted in the merging area CfA where the merging lane Lnc does not narrow (see FIG. 11), the driver is notified that restart of the autonomous travel control is possible (S66 in FIG. 20). Therefore, the driver can restart an interrupted second task early. As a result, the convenience of autonomous driving can be further improved.

In a second modification of the above-described embodiment, when the merging area CfA has a road shape in which the number of lanes does not decrease, continuation of the autonomous travel control is permitted even when the area level 3 is performed. That is, in the second modification, when the merging area CfA has a road shape in which the number of lanes does not decrease, the continuation of the autonomous travel control is permitted regardless of a control mode of the autonomous travel control.

In a third modification of the above-described embodiment, multiple control modes are not set for autonomous travel control. The autonomous driving ECU 50*b* can perform the autonomous travel control corresponding to the traffic congestion scene level 3 of the above-described embodiment only under a congested environment in the AD area. Also in the third modification, when the merging area CfA has a road shape in which the number of lanes does not decrease, continuation of the autonomous travel control is permitted.

In a fourth modification of the above-described embodiment, when the merging vehicle Ac is recognized while the subject vehicle is traveling in the merging area CfA with autonomous travel control continued, interruption of the autonomous travel control and a transition to hands-off driving support control are determined. In this case, based on the grasping of the merging vehicle Ac, the driver is requested to restart surroundings monitoring. Information on the merging vehicle Ac may be generated by a roadside device, which takes the merging lane Lnc as a detection target, and transmitted to the in-vehicle communication device 39 mounted on the subject vehicle Am.

A mode of merging vehicle notification in the above-described embodiment may be appropriately changed. As an example, a display device different from the meter display 21 and the ambient light 25 may be used for the merging vehicle notification. Further, a display color, a display size, display luminance, animation, presence or absence of blinking, and the like of contents used for the merging vehicle notification, the restart requests for surroundings monitoring and steering wheel gripping, the driving takeover request, and the like may be appropriately changed. In addition, a voice message may be reproduced in each information presentation.

In a fifth modification of the above-described embodiment, functions of the driving support ECU 50*a* and the autonomous driving ECU 50*b* are provided by one autonomous driving ECU. That is, the function of the driving support ECU 50*a* is implemented in the autonomous driving ECU 50*b* according to the fifth modification. In the fifth modification, the integrated autonomous driving ECU corresponds to the "autonomous driving control device". Further, a function of the HCU 100 may be further implemented in the autonomous driving ECU. In this embodiment, the presentation control unit 88 corresponds to the "notification control unit".

In the above-described embodiment, the functions provided by the driving support ECU, the autonomous driving ECU, and the HCU can be provided by software and hardware for executing the software, only software, only hardware, or a composite combination thereof. Further, when providing the functions by an electronic circuit serving as hardware, the functions can be provided by a digital circuit including a large number of logic circuits or by an analog circuit.

Each processing unit of the above-described embodiment is hardware for arithmetic processing combined with the RAM. The processing unit includes at least one arithmetic core such as a central processing unit (CPU) and a graphics processing unit (GPU). The processing unit may further include a field-programmable gate array (FPGA), a neural network processing unit (NPU), an IP core having another dedicated function, and the like. The processing unit according to the above-described embodiment may be individually mounted on a printed circuit board, or may be mounted on an application specific integrated circuit (ASIC), an FPGA, or the like.

A form of a storage medium (a non-transitory tangible computer-readable medium, that is, a non-transitory tangible storage medium) that stores various programs and the like may also be appropriately changed. The storage medium is not limited to a configuration provided on a circuit board, and may be provided in a form of a memory card or the like, inserted into a slot portion, and electrically connected to a control circuit of the autonomous driving ECU or the HCU. Further, the storage medium may be an optical disk, a hard disk drive or the like serving as a copy source or distribution source of a program to the autonomous driving ECU or the HCU.

The vehicle on which the autonomous driving system and the HMI system are mounted is not limited to a general private passenger vehicle, and may be a rental vehicle, a manned taxi vehicle, a ride-sharing vehicle, a cargo vehicle, a bus, or the like. The vehicle on which the autonomous driving system and the HMI system are mounted may be a right-hand drive vehicle or a left-hand drive vehicle. Further, a traffic environment in which the vehicle travels may be a traffic environment in which left-hand traffic is the norm or a traffic environment in which right-hand traffic is the norm. Information presentation control and the autonomous driving control according to the present disclosure may be optimized as appropriate in accordance with the road traffic law of each country and region, the steering wheel position of the vehicle, and the like.

The control unit and the method thereof described in the present disclosure may be implemented by a dedicated computer constituting a processor programmed to execute one or multiple functions embodied by a computer program. Alternatively, the device and the method thereof described in the present disclosure may be implemented by a dedicated hardware logic circuit. Alternatively, the device and the method thereof described in the present disclosure may be implemented by one or more dedicated computers implemented by a combination of a processor that executes a computer program and one or more hardware logic circuits. The computer program may be stored in a non-transitory tangible computer-readable recording medium as an instruction to be executed by a computer.

What is claimed is:

1. An autonomous driving control device configured to allow a subject vehicle to travel with autonomous travel control in which a driver has no surroundings monitoring obligation, the autonomous driving control device comprising:

a processor and a memory configured to cause the autonomous driving control device to implement:

a road shape grasping unit configured to grasp, as a road shape of a merging area present in a traveling direction of the subject vehicle traveling with the autonomous travel control, at least whether a number of lanes decreases in the merging area; and a continuation determination unit configured to determine whether to continue the autonomous travel control in the merging area, according to whether the merging area has the road shape in which the number of lanes decreases, wherein the continuation determination unit is configured to restrict continuation of the autonomous travel control, when the merging area has a road shape in which the number of lanes decreases, and permit continuation of the autonomous travel control, when the merging area has a road shape in which a number of lanes does not decrease.

2. The autonomous driving control device according to claim 1, wherein the processor and the memory are further configured to cause the autonomous driving control device to implement:

a notification control unit configured to perform notification indicating presence of a merging vehicle, based on occurrence of the merging vehicle that attempts to merge into a subject vehicle lane in which the subject vehicle travels, when the autonomous travel control is continued in the merging area having a road shape in which the number of lanes does not decrease.

3. The autonomous driving control device according to claim 1, wherein the continuation determination unit is configured to when a control mode of the autonomous travel control is traffic congestion limited control performed only for traveling during traffic congestion, and restrict continuation of the autonomous travel control, when the control mode is different from the traffic congestion limited control, even in a case where the merging area has a road shape in which the number of lanes does not decrease.

4. An autonomous driving control device configured to allow a subject vehicle to travel with autonomous travel control in which a driver has no surroundings monitoring obligation, the autonomous driving control device comprising:

a processor and a memory configured to cause the autonomous driving control device to implement:

a road shape grasping unit configured to grasp, as a road shape of a merging area in which a merging lane and a main vehicular lane merge, at least whether a number of lanes decreases in the merging area, when the subject vehicle travels with the autonomous travel control in the merging lane; and a continuation determination unit configured to change a driving control state of the subject vehicle including the autonomous travel control, according to whether the merging area has the road shape in which the number of lanes decreases, wherein the continuation determination unit is configured to change the driving control state to a state having a higher dependency on the driver, when the merging area has a road shape in which the merging lane narrows than when the merging area has a road shape in which the merging lane does not narrow.

5. The autonomous driving control device according to claim 4, wherein the continuation determination unit is configured to perform notification of requesting the driver to perform a driving takeover earlier, when the merging area has a road shape in which the merging lane narrows in the merging area than when the merging area has a road shape in which the merging lane does not narrow.

6. The autonomous driving control device according to claim 4, wherein the processor and the memory are further configured to cause the autonomous driving control device to implement:

a notification control unit configured to notify the driver that restart of the autonomous travel control is possible, when restart of the autonomous travel control becomes possible after the autonomous travel control is interrupted in the merging area where the merging lane does not narrow.

7. The autonomous driving control device according to claim 4, wherein the continuation determination unit is configured to start stop control of stopping the subject vehicle at a side of a position where the merging lane disappears, when the merging area has a road shape in which the merging lane narrows and lane change to the main vehicular lane is not performed.

8. The autonomous driving control device according to claim 4, wherein the continuation determination unit is configured to change the driving control state to a state having a higher dependency on the driver, when the main vehicular lane is congested than when the main vehicular lane is not congested.

9. The autonomous driving control device according to claim 4, wherein the continuation determination unit causes the subject vehicle to merge in the merging area while continuing the autonomous travel control, when the merging lane is congested at a side of the merging area.

10. The autonomous driving control device according to claim 4, wherein the processor and the memory are further configured to cause the autonomous driving control device to implement:

a subject vehicle position grasping unit configured to grasp a position of a subject vehicle lane in which the subject vehicle travels among a plurality of merging lanes, when the merging area has a road shape in which the plurality of merging lanes merge with the main vehicular lane, wherein the continuation determination unit is configured to change between the driving control state of the subject vehicle in a case where the merging lane adjacent to the main vehicular lane is the subject vehicle lane and the driving control state of the subject vehicle in a case where the merging lane separated from the main vehicular lane is the subject vehicle lane.

11. The autonomous driving control device according to claim 10, wherein the continuation determination unit is configured to change the driving control state to a state having a higher dependency on the driver in the case where the merging lane separated from the main vehicular lane is the subject vehicle lane than in the case where the merging lane adjacent to the main vehicular lane is the subject vehicle lane.

12. The autonomous driving control device according to claim 4, wherein the continuation determination unit is configured to end the autonomous travel control earlier when approaching the merging area that is a prohibition area, in which traveling with the autonomous travel control is prohibited, than when approaching the prohibition area set in a road section different from the merging area.

13. The autonomous driving control device according to claim 4, wherein the continuation determination unit is configured to restrict execution of processing of changing the driving control state to a state having a lower dependency on the driver, when the subject vehicle is scheduled to perform lane change after merging in the merging area.

14. The autonomous driving control device according to claim 4, wherein the continuation determination unit is configured to, when the autonomous travel control is continued in the merging area, narrow an allowable range of a specific act other than driving which the driver is permitted to perform, before reaching the merging area.

15. An autonomous driving control device configured to allow a subject vehicle to travel with autonomous travel control in which a driver has no surroundings monitoring obligation, the autonomous driving control device comprising:

a processor and a memory configured to cause the autonomous driving control device to implement:

a road shape grasping unit configured to grasp whether a branching area, in which a number of lanes increases, is present in a traveling direction of the subject vehicle traveling with the autonomous travel control;

a subject vehicle position grasping unit configured to grasp a position of a subject vehicle lane in which the subject vehicle travels; and a continuation determination unit configured to interrupt the autonomous travel control, when a branch lane, which is an increased lane in the branching area, is adjacent to the subject vehicle lane, and permit continuation of the autonomous travel control, when the branch lane is not adjacent to the subject vehicle lane, wherein the continuation determination unit is configured to determine transition to driving support control, in which the driver has a steering wheel gripping obligation, or manual driving, when the subject vehicle lane is adjacent to the branch lane and when a scheduled route of the subject vehicle is set to the branch lane, and determine transition to driving support control, in which the driver has a surroundings monitoring obligation, when the subject vehicle lane is adjacent to the branch lane and when the scheduled route of the subject vehicle is not set to the branch lane.

16. An autonomous driving control device configured to allow a subject vehicle to travel with autonomous travel control in which a driver has no surroundings monitoring obligation, the autonomous driving control device comprising:

a processor and a memory configured to cause the autonomous driving control device to implement:

a road shape grasping unit configured to, when a scheduled route of the subject vehicle, which travels with the autonomous travel control on a specific road on which traveling with the autonomous travel control is permitted, is set to a branch lane branching from a main vehicular lane of the specific road, grasp whether an end of the branch lane is an exit from the specific road; and a control change unit configured to, when the autonomous travel control is ended in the subject vehicle traveling toward the branch lane, change a content of travel control of the subject vehicle after the autonomous travel control is ended, according to whether the end of the branch lane is the exit, wherein the control change unit is configured to switch from the autonomous travel control to manual driving of the driver at a side of a start point of the branch lane, when the end of the branch lane is the exit, and switch from the autonomous travel control to driving support control, in which the driver has at least a surroundings monitoring obligation, at the side of the start point of the branch lane, when the end of the branch lane is not the exit.

17. The autonomous driving control device according to claim 16, wherein the control change unit is configured to perform switching from the autonomous travel control to driving support control, in which the driver has a surroundings monitoring obligation, when the end of the branch lane is not the exit.

18. The autonomous driving control device according to claim 16, wherein the control change unit is configured to perform switching from the autonomous travel control to manual driving of the driver, when the end of the branch lane is the exit.

* * * * *